United States Patent
McGrath

(10) Patent No.: US 7,576,953 B1
(45) Date of Patent: Aug. 18, 2009

(54) DISK DRIVE LATCH WITH EXTERNAL COIL

(75) Inventor: Michael C. McGrath, Pleasanton, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 476 days.

(21) Appl. No.: 11/400,423

(22) Filed: Apr. 7, 2006

Related U.S. Application Data

(60) Provisional application No. 60/678,509, filed on May 6, 2005.

(51) Int. Cl.
*G11B 5/54* (2006.01)

(52) U.S. Cl. .................................................. 360/256.2

(58) Field of Classification Search ................ 360/256, 360/256.2, 256.3, 256.4
See application file for complete search history.

(56) References Cited

U.S. PATENT DOCUMENTS

| | | | |
|---|---|---|---|
| 4,583,142 A * | 4/1986 | Skarky | 360/256 |
| 5,189,576 A | 2/1993 | Morehouse et al. | |
| 5,296,986 A | 3/1994 | Morehouse et al. | |
| 5,404,257 A | 4/1995 | Alt | |
| 5,528,437 A * | 6/1996 | Mastache | 360/256.4 |
| 5,623,384 A | 4/1997 | Hickox et al. | |
| 5,982,586 A | 11/1999 | Scura | |
| 6,011,672 A | 1/2000 | Matsumoto | |
| 6,088,193 A | 7/2000 | Misso et al. | |
| 6,134,077 A | 10/2000 | Misso et al. | |
| 6,327,119 B1 | 12/2001 | Barina et al. | |
| 6,469,871 B1 * | 10/2002 | Wang | 360/256.4 |
| 2002/0114097 A1 | 8/2002 | Kim | |

* cited by examiner

*Primary Examiner*—Angel A. Castro
(74) *Attorney, Agent, or Firm*—Westman, Champlin & Kelly, P.A.

(57) ABSTRACT

A latch (100) for a disk drive head positioner assembly (26) is disclosed. A latch assembly (140) is mounted on a printed circuit board (136), and is thereby disposed exteriorly of the disk drive (10'). This latch assembly (140) includes a coil (144), a first pole (148), and a second pole (156). A latch housing (104) includes a pair of blind holes (112) for receiving the poles (148, 156). The latch (100) also includes an armature (120) that is disposed within an interior space (17) of the disk drive (10') and that is rotatably supported by the latch housing (104). This armature (120) includes a permanent magnet (124) and a stop (128). The armature (120) is rotated to either dispose the stop (128) in the path of or out of the path of a tail (32) of the head positioner assembly (26) (the latched and unlatched positions, respectively).

34 Claims, 15 Drawing Sheets

DISK DRIVE LATCH WITH EXTERNAL COIL

CROSS-REFERENCE TO RELATED APPLICATIONS

This patent application claims priority under 35 U.S.C. §119(e) to U.S. Provisional Patent Application Ser. No. 60/678,509, that was filed on May 6, 2005, that is entitled "Low Cost Electrically Actuated Latch for HDD," and the entire disclosure of which is hereby incorporated by reference in its entirety herein.

FIELD OF THE INVENTION

The present invention general relates to the field of disk drive head positioner assembly latches and, more particularly, to solenoid-type disk drive head positioner assembly latches.

BACKGROUND

Data is stored on disk drives utilizing a variety of designs. In one design, a head (e.g., a transducer) is mounted on or otherwise integrated with a slider that may fly or ride on an air bearing or a thin layer of air that is disposed adjacent to a rapidly rotating computer readable disk media (hereafter a "data storage disk") as the data is transferred between the head and the corresponding data storage disk. The slider is mounted on a suspension or a load beam, that in turn is mounted on a rigid actuator arm or an actuator arm tip of what may be characterized as a head positioner assembly that is movably interconnected with a disk drive base plate and/or cover. The head positioner assembly would include multiple actuator arms/actuator arm tips for mounting multiple suspensions and heads in order to access both sides of a disk or when multiple disks are utilized in a disk drive. In any case, the head positioner assembly moves each of its heads across the corresponding data storage disk in a desired manner and to a desired location on the data storage disk to read and/or write data.

When the disk drive is not in operation, the head positioner assembly may be moved such that its heads are in a "parked position". This will reduce the potential for damage to the data storage disks and/or heads in the event that the disk drive is subject to a non-operational shock event or the like. In a first type of disk drive, known in the art as a "dynamic load/unload" disk drive, the head positioner assembly is typically moved to position its head(s) in a "parked position" using what is commonly referred to as a load/unload ramp. Here, each of the heads are maintained in spaced relation to their corresponding data storage disk by the load/unload ramp. In a second type of disk drive, known in the art as a "contact start/stop" disk drive, the head positioner assembly moves the head(s) to a "parked position" that is located directly on typically a non-data zone of the corresponding data storage disk, typically near the center of the corresponding data storage disk. In either case, when the disk drive is not operating and if/when the disk drive is exposed to a shock event or the like, it is desirable in most cases to at least attempt to retain the head positioner assembly in the "parked position" to reduce the potential for undesired contact or relative movement between each of the heads of the disk drive and the data storage zone of the corresponding data storage disk.

Various types of latches have been proposed to attempt to retain the head positioner assembly in the parked position when the disk drive is exposed to a shock event or the like in a non-operational mode. There are basically two types of latches for mobile disk drives—inertial latches and electrical/solenoid-type latches. Inertial disk drive latches have two significant disadvantages. One is that they may be noisy. Inertial disk drive latches may "rattle," and the consumer may perceive this noise to be a defect of some type. Another is that inertial disk drive latches are typically tuned to meet a certain shock specification. However, there are other shock conditions that may be encountered, such as shock events having different pulse durations or compound shock events, that may cause the inertial disk drive latch to fail to perform as desired/required.

Solenoid disk drive latches may be more reliable than inertial disk drive latches, but are commonly more expensive. For instance, the coil of known solenoid disk drive latches is disposed within the interior of the disk drive. In order to electrically interconnect the coil to the printed circuit board assembly, holes are drilled in the base plate of the drive. Grommets may then be positioned within these holes, and wires that are connected to the coil may then be routed through the grommets for attachment to the printed circuit board assembly. Leads associated with these wires are typically soldered to a connector or flex circuit, which is then connected to the printed circuit board assembly. The holes in the base plate through which the wires extend must also typically be potted. As such, this approach is both expensive and labor intensive. There are other associated problems. One is that the coil of the solenoid disk drive latch is exposed to the inside of the disk drive, creating an outgassing concern. Another is that it may be very difficult, time consuming, and/or otherwise simply not feasible to just replace the solenoid disk drive latch, increasing the scrap cost of bad parts.

SUMMARY OF THE INVENTION

The present invention is generally embodied by a disk drive that includes a latch for a head positioner assembly. This latch may be used to engage the head positioner assembly after it has been parked at the end of normal disk drive operations and for when the drive has been exposed to a shock event or the like. Each head used by the disk drive could be disposed on a corresponding data storage disk when the head positioner assembly is parked, or the head positioner assembly could be parked using a load/unload ramp such that each head used by the disk drive is maintained in spaced relation to its corresponding data storage disk when the head positioner assembly is parked.

A first aspect of the present invention is embodied by a disk drive having a disk drive housing, a head positioner assembly, a computer-readable storage medium, and a latch. An interior space is defined at least in part by the disk drive housing, and both the head positioner assembly and the computer-readable storage medium are disposed within this interior space. The latch includes first and second latch elements, with the first latch element being disposed within the interior space and engageable with the head positioner assembly, and with the second latch element being disposed outside of the interior space (e.g., exteriorly of the disk drive housing).

Various refinements exist of the features noted in relation to the first aspect of the present invention. Further features may also be incorporated in the first aspect of the present invention as well. These refinements and additional features may exist individually or in any combination. The disk drive housing may be of any appropriate size, shape, and/or configuration. In one embodiment, the disk drive housing is in the form of a base plate and a cover that is separately attached to the base plate. Likewise, the head positioner assembly also may be of any appropriate size, shape, and/or configuration. For instance, the head positioner assembly may be rotatably or pivotally mounted on an appropriate bearing for movement about a certain axis (e.g., a pivot bearing). The head positioner assembly may include any appropriate number of head-gimbal assemblies, where each head-gimbal assembly includes a suspension, a slider that is supported by its corresponding suspension, and a read/write head that is mounted on, integrated with, or otherwise carried by its corresponding slider. The computer-readable storage medium may also be of any appropriate type and in any appropriate form. In one embodiment, the computer-readable storage medium is in the form of one or more data storage disks, where each such disk is rotatable about a certain axis and where multiple disks would be spaced along a common rotational axis.

The latch used by the disk drive of the first aspect may be characterized as being of the solenoid-type (e.g., electrically actuated). That is, the latch may move between two positions. With the latch being in its unlatched position, the head positioner assembly is free to move. With the latch being in its latched position, the latch may engage the head positioner assembly to keep the head positioner assembly from moving in a certain direction (e.g., toward the computer-readable storage medium). The latch could be configured such that it is in its unlatched position when no electrical signal is being provided to the latch, and such that it is in its latched position when an electrical signal is being provided to the latch, or vice versa. Typically, it would be desirable for the latch to be configured such that it is in its latched position when there is no electrical signal (e.g., to accommodate having the latch be in its latched position during shipment and when no electrical power is available). Any appropriate way of controlling the latch may be employed (e.g., the latch may operate on a command from the processor, and a command may be issued for a number of reasons).

The first latch element used by the disk drive of the first aspect may be a movable structure and further may include a stop of any appropriate size, shape, and/or configuration. Generally, the first latch element may be movable into a position where this stop is disposed within a path of the head positioner assembly to engage the head positioner assembly and to thereafter keep the head positioner assembly from moving in a first direction (e.g., toward the computer-readable storage medium). In one embodiment, the first latch element includes a magnet. Typically this magnet would be of the permanent type, and in any case may be formed from any appropriate material or combination of materials. The first latch element also may be characterized as being a rotatable armature that includes both a magnet and a stop.

The disk drive of the first aspect may include a printed circuit board that is disposed outside of the interior space, and the second latch element may be mounted on this printed circuit board. The second latch element further may be in the form of one or more components. For instance, the second latch element may include a coil, and this coil may be mounted on or interconnected with a printed circuit board. The second latch element may also be in the form of a coil, a first pole, and a second pole. An interior surface that interfaces with the interior space of the drive may include a pair of hollow protrusions, and the first and second poles may be received within this pair of hollow protrusions in a manner such that the second latch element is not part of the interior surface in this case (e.g. the hollow protrusions of the interior surface isolate the second latch element from the interior of the drive). This coil, first pole, and second pole may be collectively mounted on or interconnected with a printed circuit board. In any case, at least a portion of the first latch element may be located within the interior space at a location that is between the noted pair of hollow protrusions that receive the first and second poles.

The disk drive housing used by the disk drive of the first aspect may be contoured to define the above-noted pair of hollow protrusions that receive the first and second poles of the latch. In another embodiment, the disk drive housing (e.g., the base plate) includes a latch housing aperture, and a latch housing of the latch may be disposed within this latch housing aperture. This latch housing may include the above-noted pair of protrusions that receive the first and second poles in the case of the above-noted configuration of the second latch element. Further in this regard, the latch housing may include first and second blind holes that receive the above-noted first and second poles, respectively, and where these first and second blind holes are accessible from outside of the interior space of the drive. Another characterization is that the first and second poles may extend within the latch housing from a location that is outside of the interior space of the drive, but remain isolated from this interior space by the latch housing.

In one embodiment, the first latch element is supported by the above-noted latch housing within the interior space. In another embodiment, the first latch element is rotatably supported by this latch housing, and further includes a magnet and a stop. Generally, the first latch element may assume a position where this stop is disposed within a path of the head positioner assembly to engage the head positioner assembly and to thereafter keep the head positioner assembly from moving in a first direction (e.g., toward the computer-readable storage medium).

Additional characterizations may be made in relation to the above-noted configuration of a second latch element that includes a coil, first pole, and second pole. One is that the first and second poles may be of a common length. Another is that the first and second poles may be of different lengths. In one embodiment, the first pole includes a curved upper portion. One or more of the following features may be used in relation to this particular first pole configuration, either individually or in any combination: 1) the second pole may be shorter than the first pole; 2) the latch may utilize a third pole that is disposed within the interior space of the drive and adjacent to the hollow protrusion that receives the second pole; and 3) the curved upper portion of the first pole may be disposed at a lower elevation than a rotational axis of the first latch element when the disk drive is in a horizontal orientation, and the third pole may include a curved upper portion that is disposed at a higher elevation than a rotational axis of the first latch element when the disk drive is in the noted horizontal orientation.

A second aspect of the present invention is embodied by a disk drive that uses a disk drive housing, a head positioner assembly, a computer-readable storage medium, a latch housing, and a latch. An interior space is defined at least in part by the disk drive housing, and both the head positioner assembly and the computer-readable storage medium are disposed within this interior space. The disk drive housing includes a latch housing aperture, and the latch housing is disposed within this latch housing aperture. The latch includes a coil, a first pole, a second pole, and a movable first latch element. The first and second poles extend within the latch housing and are isolated from the interior space of the drive by the latch housing. The first latch element is disposed within the interior space at a location so as to be able to interact with the first and second poles.

Various refinements exist of the features noted in relation to the second aspect of the present invention. Further features may also be incorporated in the second aspect of the present invention as well. These refinements and additional features may exist individually or in any combination. The disk drive housing may be of any appropriate size, shape, and/or configuration. In one embodiment, the disk drive housing is in the form of a base plate and a cover that is separately attached to the base plate. Likewise, the head positioner assembly also may be of any appropriate size, shape, and/or configuration. For instance, the head positioner assembly may be rotatably or pivotally mounted on an appropriate bearing for movement about a certain axis (e.g., a pivot bearing). The head positioner assembly may include any appropriate number of head-gimbal assemblies, where each head-gimbal assembly includes a suspension, a slider that is supported by its corresponding suspension, and a read/write head that is mounted on, integrated with, or otherwise carried by its corresponding slider. The computer-readable storage medium may also be of any appropriate type and in any appropriate form. In one embodiment, the computer-readable storage medium is in the form of one or more data storage disks, where each such disk is rotatable about a certain axis and where multiple disks would be spaced along a common rotational axis.

The latch used by the disk drive of the second aspect may be characterized as being of the solenoid-type (e.g., electrically actuated). That is, the latch may move between two positions. With the latch being in its unlatched position, the head positioner assembly is free to move. With the latch being in its latched position, the latch may engage the head positioner assembly to keep the head positioner assembly from moving in a certain direction (e.g., toward the computer-readable storage medium) from its parked position. The latch could be configured such that it is in its unlatched position when no electrical signal is being provided to the latch, and such that it is in its latched position when an electrical signal is being provided to the latch, or vice versa. Typically, it would be desirable for the latch to be configured such that it is in its latched position when there is no electrical signal (e.g., to accommodate having the latch be in its latched position during shipment and when no electrical power is available). Any appropriate way of controlling the latch may be employed (e.g., the latch may operate on a command from the processor, and a command may be issued for a number of reasons).

The first latch element used by the disk drive of the second aspect may include a stop of any appropriate size, shape, and/or configuration. Generally, the first latch element may be movable into a position where this stop is disposed within a path of the head positioner assembly to engage the head positioner assembly and to thereafter keep the head positioner assembly from moving in a first direction (e.g., toward the computer-readable storage medium). In one embodiment, the first latch element includes a magnet. Typically this magnet would be of the permanent type, and in any case may be formed from any appropriate material or combination of materials. The first latch element also may be characterized as being a rotatable armature that includes both a magnet and a stop.

In one embodiment, the first latch element is supported by the latch housing within the interior space of the drive in the case of the second aspect. In another embodiment, the first latch element is rotatably supported by this latch housing, and further includes a magnet and a stop. Generally, the first latch element may assume a position where this stop is disposed within a path of the head positioner assembly to engage the head positioner assembly and to thereafter keep the head positioner assembly from moving in a first direction (e.g., toward the computer-readable storage medium). In another embodiment, the disk drive of the second aspect further includes a printed circuit board that is disposed outside of the interior space, and a latch assembly that includes the coil, first pole, and second pole may be mounted on this printed circuit board. In yet another embodiment, the latch housing includes first and second blind holes for receiving its first and second poles, respectively, and these blind holes are accessible from outside of the drive's interior space.

Additional characterizations may be made in relation to the latch used by the disk drive of the second aspect. One is that the first and second poles may be of a common length. Another is that the first and second poles may be of different lengths. In one embodiment, the first pole includes a curved upper portion. One or more of the following features may be used in relation to this particular first pole configuration, either individually or in any combination: 1) the second pole may be shorter than the first pole; 2) the latch may utilize a third pole that is disposed within the interior space of the drive and adjacent to the hollow protrusion that receives the second pole; and 3) the curved upper portion of the first pole may be disposed at a lower elevation than a rotational axis of the first latch element when the disk drive is in a horizontal orientation, and the third pole may include a curved upper portion that is disposed at a higher elevation than the rotational axis of the first latch element when the disk drive is in the noted horizontal orientation.

A third aspect of the present invention is embodied by a disk drive that uses a disk drive housing, a printed circuit board, a head positioner assembly, a computer-readable storage medium, a latch housing, and a latch. An interior space is defined at least in part by the disk drive housing, and both the head positioner assembly and the computer-readable storage medium are disposed within this interior space. The printed circuit board is mounted on the disk drive housing outside of this interior space. The disk drive housing includes a latch housing aperture, and the latch housing is disposed within this latch housing aperture. The latch includes a latch assembly that is mounted on the printed circuit board, as well as a movable first latch element. Components of the latch assembly include a coil, a first pole, and a second pole. The first and second poles are received within the latch housing, and the first latch element is disposed within the interior space at a location so as to be able to interact with the first and second poles. The various features discussed above with regard to the second aspect may be used by this third aspect, individually or in any combination.

A fourth aspect of the present invention is embodied by a disk drive having a disk drive housing, a printed circuit board, a head positioner assembly, a computer-readable storage medium, and a latch. An interior space is defined at least in part by the disk drive housing, and both the head positioner assembly and the computer-readable storage medium are disposed within this interior space. The printed circuit board is mounted on the disk drive housing outside of this interior space. The latch includes first and second latch elements, with the first latch element being disposed within the interior space and engageable with the head positioner assembly, and with the second latch element being mounted on the printed circuit board. The various features discussed above in relation to any of the first through the third aspects may be used by this fourth aspect, individually or in any combination.

DETAILED DESCRIPTION

Figure 1:
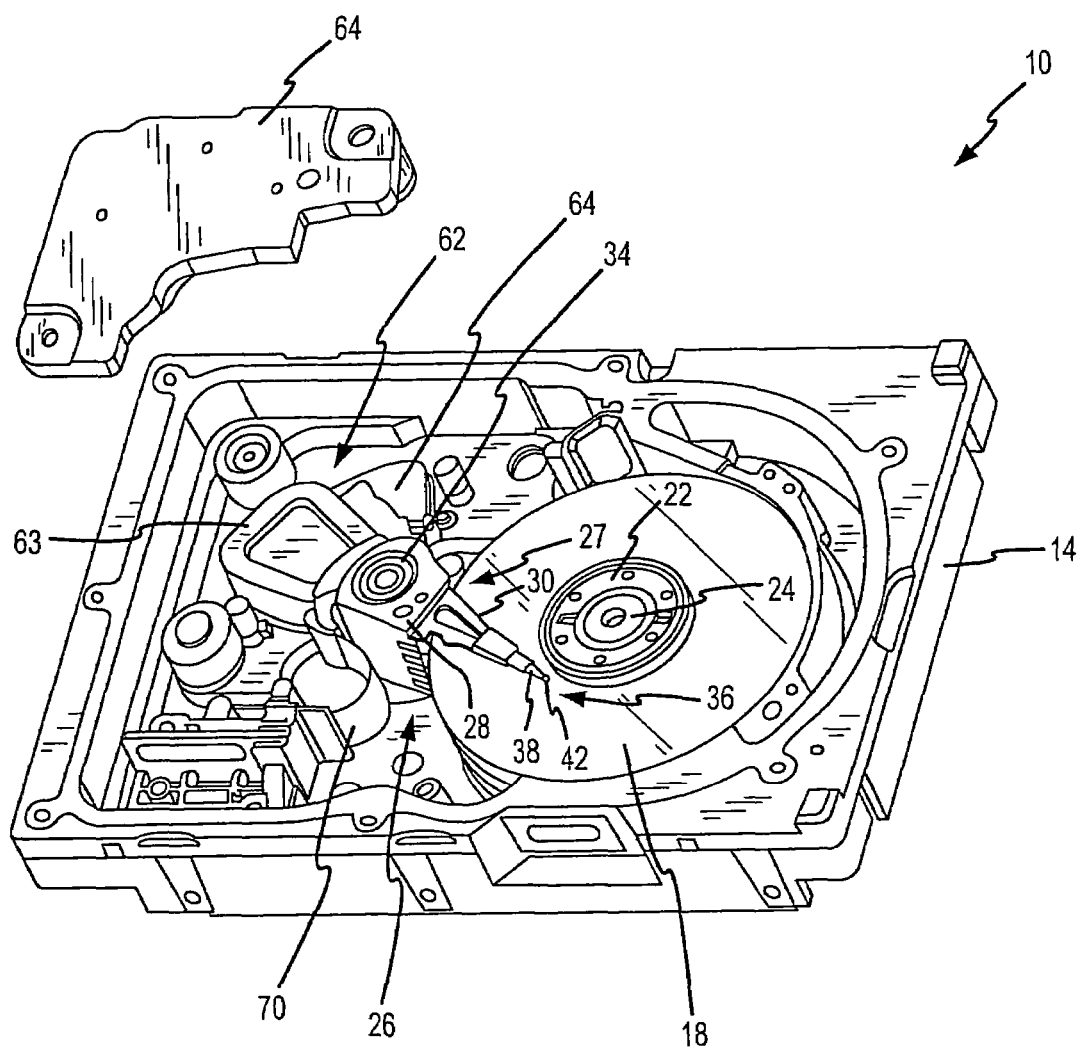
FIG. 1 is a perspective view of a prior art disk drive.
Figure 2:
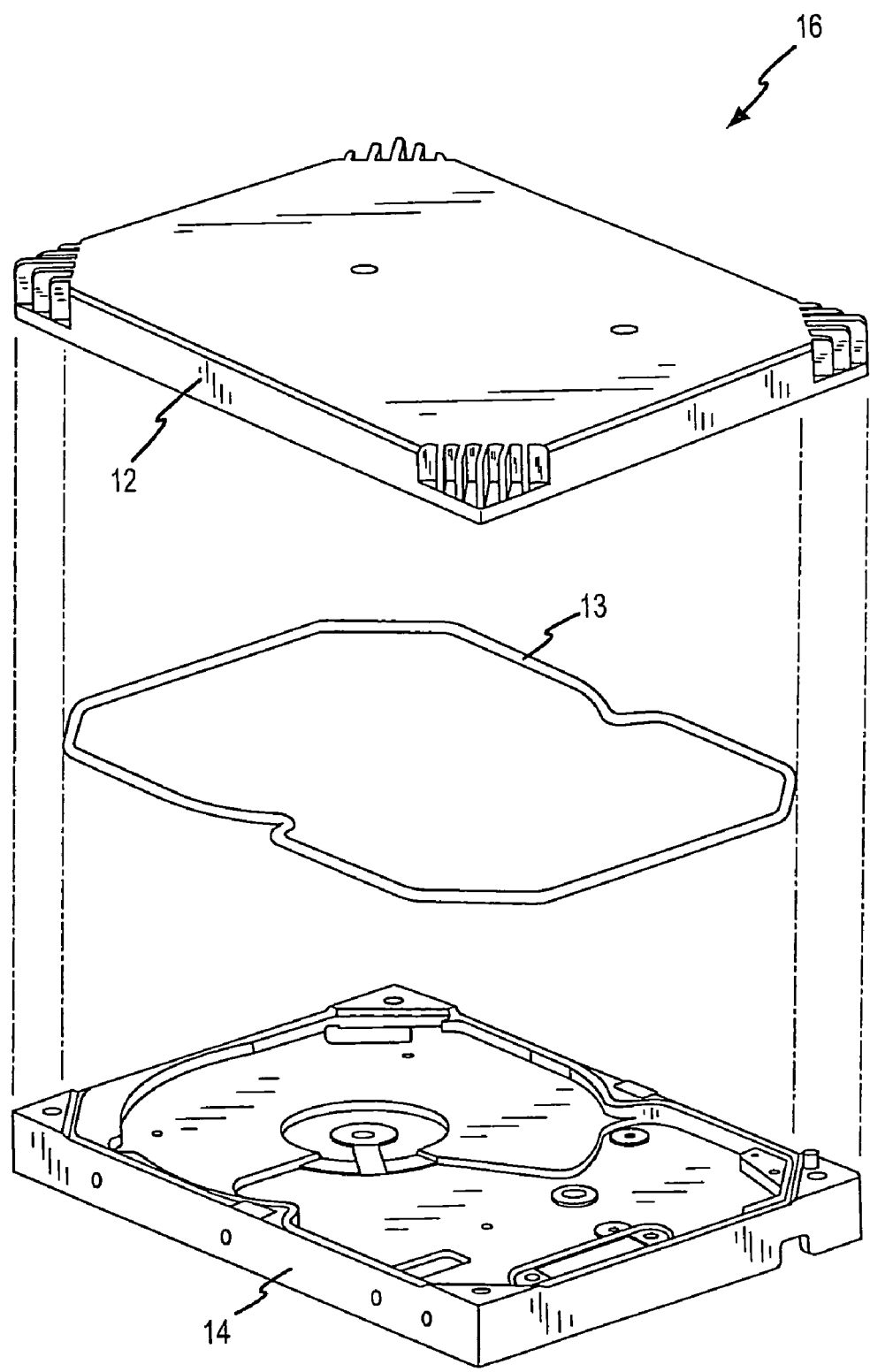
FIG. 2 is an exploded, perspective view of a prior art disk drive housing for the disk drive of FIG. 1.

One embodiment of a prior art disk drive 10 is illustrated in FIGS. 1-4. However, this disk drive 10 may be adapted to incorporate a head positioner assembly latch having at least one component disposed within the interior of the drive and at least one component disposed exteriorly of the drive, the combination of which is not in the prior art. The disk drive 10 generally includes a disk drive housing 16 of any appropriate configuration that defines an enclosed space for the various disk drive components. Here the housing 16 includes a base plate 14 that is typically detachably interconnected with a cover 12. A suitable gasket 13 may be disposed between the cover 12 and the base plate 14 to enhance the seal therebetween.

The disk drive 10 includes one or more data storage disks 18 of any appropriate computer-readable data storage media. Typically both of the major surfaces of each data storage disk 18 include a plurality of concentrically disposed tracks for data storage purposes. Each disk 18 is mounted on a hub by a disk clamp 22, and the hub is rotatably interconnected with the disk drive base plate 14 and/or cover 12. A spindle motor rotates the hub and attached clamp 22 about a shaft 24 of the spindle motor to simultaneously spin the data storage disk(s) 18 at an appropriate rate.

The disk drive 10 also includes a head positioner assembly 26, that in turn includes an actuator 27. The actuator 27 is in the form of an actuator body 28 having one or more individual rigid actuator arms 30 extending therefrom. This actuator body 28 is mounted on a pivot bearing 34. Each actuator arm 30 pivots about the pivot bearing 34, which in turn is rotatably supported by the base plate 14 and/or cover 12. Multiple actuator arms 30 are disposed in vertically spaced relation, with one actuator arm 30 typically being provided for each major data storage surface of each data storage disk 18 of the disk drive 10. Other actuator configurations could be utilized as well, such as an "E" block having one or more rigid actuator arm tips or the like that cantilever from a common structure, or one or more rigid actuator arms that are each mounted on the pivot bearing 34.

Movement of the head positioner assembly 26 is provided by an appropriate head stack assembly drive, such as a voice coil motor 62 or the like. The voice coil motor 62 may be characterized as a rotary drive. The voice coil motor 62 is a magnetic assembly that controls the movement of the head positioner assembly 26 under the direction of control electronics 66. Typical components of the voice coil motor 62 are a coil 63 that may be mounted on the head positioner assembly 26, and a separate voice coil motor magnet assembly, ("VCM magnet assembly") 64 that is disposed above and below this coil 63 (the upper VCM magnet assembly 64 being "exploded away" in FIG. 1). The VCM magnet assemblies 64 will typically be mounted on the housing 16 in a fixed position, with the upper VCM magnet assembly 64 being appropriately supported above the lower VCM magnet assembly. Any appropriate head positioner assembly drive type may be utilized by the disk drive 10, including a linear drive (for the case where the head positioner assembly 26 is interconnected with the base plate 14 and/or cover 12 for linear movement versus the illustrated pivoting movement about the pivot bearing 34), as well as other types of rotational/pivoting drives.

A head-gimbal assembly or HGA 36 is interconnected with each actuator arm 30 and includes a load beam or suspension 38 that is attached to the free end of each actuator arm 30 or actuator arm tip, and cantilevers therefrom. All HGAs 36 are part of the head positioner assembly 26. Typically the suspension 38 of each HGA 36 is biased at least generally toward its corresponding disk 18 by a spring-like force. A slider 42 is disposed at or near the free end of each suspension 38. What is commonly referred to in the art as the "head" 44 (e.g., at least one transducer) is appropriately mounted on the slider 42 and is used in disk drive read/write operations. Various types of read/write technologies may be utilized by the head 44 on the slider 42. In any case, the biasing forces exerted by the suspension 38 on its corresponding slider 42 thereby attempt to move the slider 42 in the direction of its corresponding disk 18. Typically this biasing force is such that if the slider 42 were positioned over its corresponding disk 18, without the disk 18 being rotated at a sufficient velocity, the slider 42 would be in contact with the disk 18.

Each head 44 is interconnected with the control electronics 66 of the disk drive 10 by a flex cable 70 that is typically mounted on the head positioner assembly 26. Signals are exchanged between the head 44 on the slider 42 and its corresponding data storage disk 18 for disk drive read and/or write operations. In this regard, the voice coil motor 62 pivots the actuator arm(s) 30 to simultaneously move each head 44 on its slider 42 "across" the corresponding data storage disk 18 to position the head 44 at the desired/required radial position on the disk 18 (i.e., at the correct track on the data storage disk 18) for disk drive read/write operations.

When the disk drive 10 is not in operation, the head positioner assembly 26 is pivoted to a "parked position" to dispose each slider 42 in a desired position relative to its corresponding data storage disk 18. The "parked position" may be at least generally at or more typically beyond a perimeter of its corresponding data storage disk 18 or at a more interior location of the corresponding disk 18, but in any case typically in vertically spaced relation to its corresponding disk 18. This is commonly referred to in the art as being a dynamic load/unload disk drive configuration. In this regard, the disk drive 10 may include a ramp assembly that is disposed beyond a perimeter of the data storage disk 18 to typically both move the corresponding slider 42 vertically away from its corresponding data storage disk 18 and to also exert somewhat of a retaining force on the corresponding actuator arm 30. Any configuration for the ramp assembly that provides the desired "parking" function may be utilized. The disk drive 10 could also be configured to be of the contact start/stop type, where each actuator arm 30 would pivot in a direction to dispose the slider(s) 42 typically toward an inner, non-data storage region of the corresponding data storage disk 18. Terminating the rotation of the data storage disk(s) 18 in this type of disk drive configuration would then result in the slider(s) 42 actually establishing contact with or "landing" on their corresponding data storage disk 18, and the slider 42 would remain on the disk 18 until disk drive operations are re-initiated. In either configuration, it may be desirable to at least attempt to retain the actuator arm(s) 30 in this parked position if the disk drive 10 is exposed to a shock event. In this regard, the disk drive 10 may include an actuator arm assembly latch that moves from a non-latching position to a latching position to engage an actuator arm 30 so as to preclude the same from pivoting in a direction which would tend to drag the slider(s) 42 across its corresponding data storage disk 18.

Figure 3:
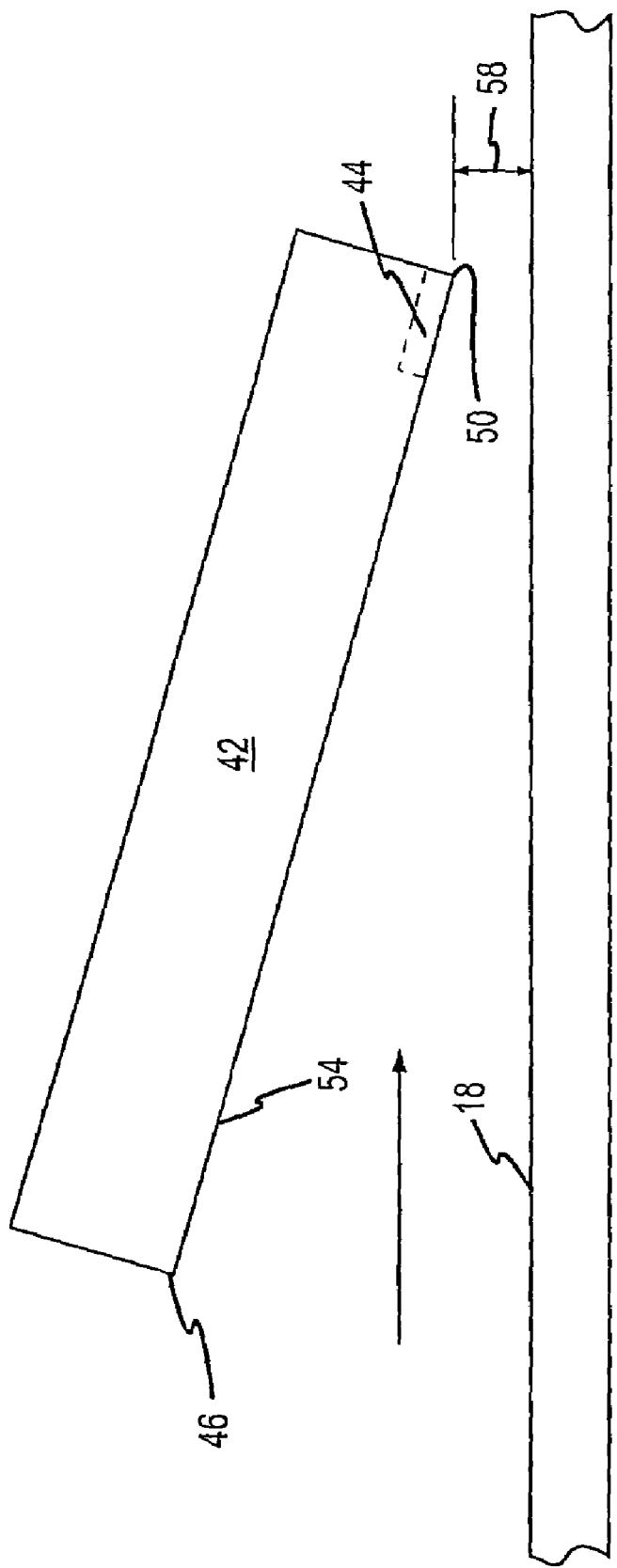
FIG. 3 is a schematic representation of a prior art flying-type slider that may be used by the disk drive of FIG. 1.

The slider 42 of the disk drive 10 may be configured to "fly" on an air bearing during rotation of its corresponding data storage 18 at a sufficient velocity. This is schematically illustrated in FIG. 3 where a lower surface 54 of the slider 42 would include an appropriate air-bearing-surface (ABS) system (not shown). Here the direction of the rotation of the disk 18 relative to the slider 42 is represented by the arrow, while the fly height of the slider 42 is represented by reference numeral 58 (measured from a reference plane of the mean of the surface roughness of the disk 18). In FIG. 3, the slider 42 is disposed at a pitch angle such that its leading edge 46 of the slider 42 is disposed further from its corresponding data storage disk 18 than its trailing edge 50. The transducer(s) 44 would typically be incorporated on the slider 42 at least generally toward its trailing edge 50 since this is positioned closest to its corresponding disk 18. Other pitch angles could be utilized for flying the slider 42. The disk drive 10 could also be configured for contact or near-contact recording (not shown).

Figure 4:
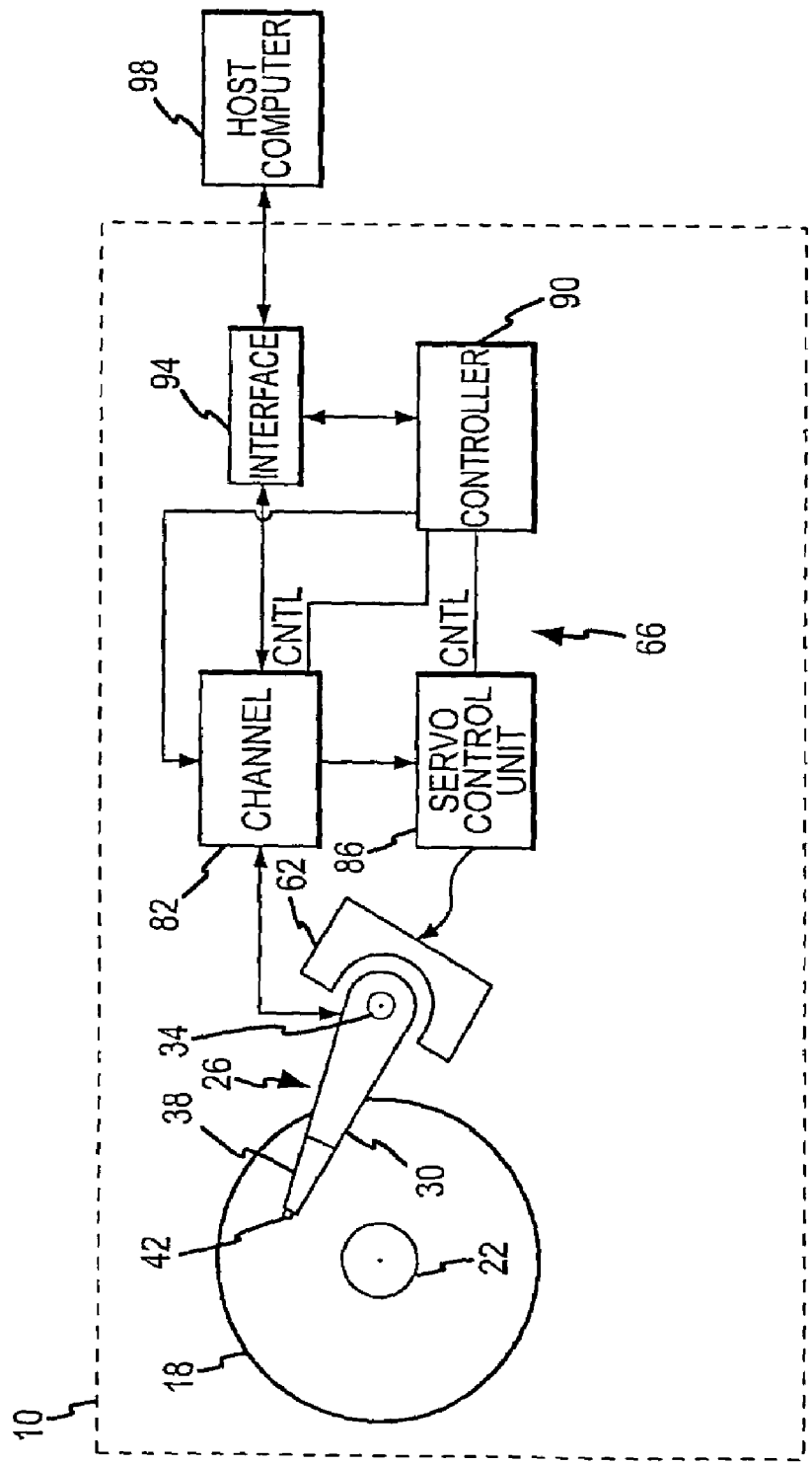
FIG. 4 is a simplified prior art electrical component block diagram of the disk drive of FIG. 1.

FIG. 4 illustrates a simplified electrical component block diagram of the disk drive 10 of FIG. 1. The control electronics 66 in this case includes a controller 90 and a servo control unit 86. The disk drive 10 in FIG. 4 also includes a channel 82, as well as an interface 94 for interconnecting the disk drive 10 with a host computer 98. During operation of the disk drive 10, the data storage disk 18 rotates. Data is stored on the data storage disk 18 in substantially concentric tracks. Data may be read from or written to the data storage disk 18 by moving the slider 42 and its head 44 to the desired track and performing the desired communication operation (i.e., a read or write operation). In one embodiment, the data storage disk 18 includes a magnetic media having concentric read/write tracks and the head 44 includes at least one transducer that is capable of communicating with this magnetic data storage disk 18. The voice coil motor 62 receives servo control information from the servo control unit 86 to cause the voice coil motor 62 to move each actuator arm 30 and its corresponding head 44 when repositioning of the head(s) 44 is desired/required. In this regard, the head(s) 44 may periodically read positioning information from the surface of the corresponding data storage disk 18 and transmit the positioning information to the servo control unit 86 via the channel 82. The servo control unit 86 compares the present position of the head(s) 44 to a desired position, with movement of the actuator arm(s) 30 being made as required for proper track alignment.

The channel 82 receives a number of inputs for processing so that data may be manipulated by the devices internal and external, such as the host computer 98, which is again interconnected with the disk drive 10 via the interface 94. One operation of the channel 82 is to receive an analog signal from the head(s) 44 and to convert the analog signal to a digital signal recognized by the host computer 98. In addition, the channel 82 facilitates the storage of information from the host computer 98 to the data storage disk(s) 18 by encoding data signals from the host computer 98 and creating a write signal, from the encoding data, which is transmitted to the head(s) 44 for storage on the corresponding data storage disk 18.

The controller 90 controls the timing and operation of other elements of the disk drive 10. The controller 90 receives input/output requests from the host computer 98 via the interface 94. Based on the input to the controller 90, the controller 90 delivers appropriate commands to the servo control unit 86 and the channel 82. For example, in a read operation, the controller 90 commands the servo control unit 86 to move the head(s) 44 to the desired track on the corresponding data storage disk 18 such that the data written on the disk 18 may be transferred to the host computer 98. Accordingly, the servo control unit 86 moves the head(s) 44 to the desired track on the corresponding data storage disk 18 using the servo positioning information read from the data storage disk 18 by the corresponding head 44. In turn, the head(s) 44 reads the information from the corresponding data storage disk 18 and transmits information to the channel 82 that converts the information so that it may be interpreted by the host computer 98.

Figure 5:
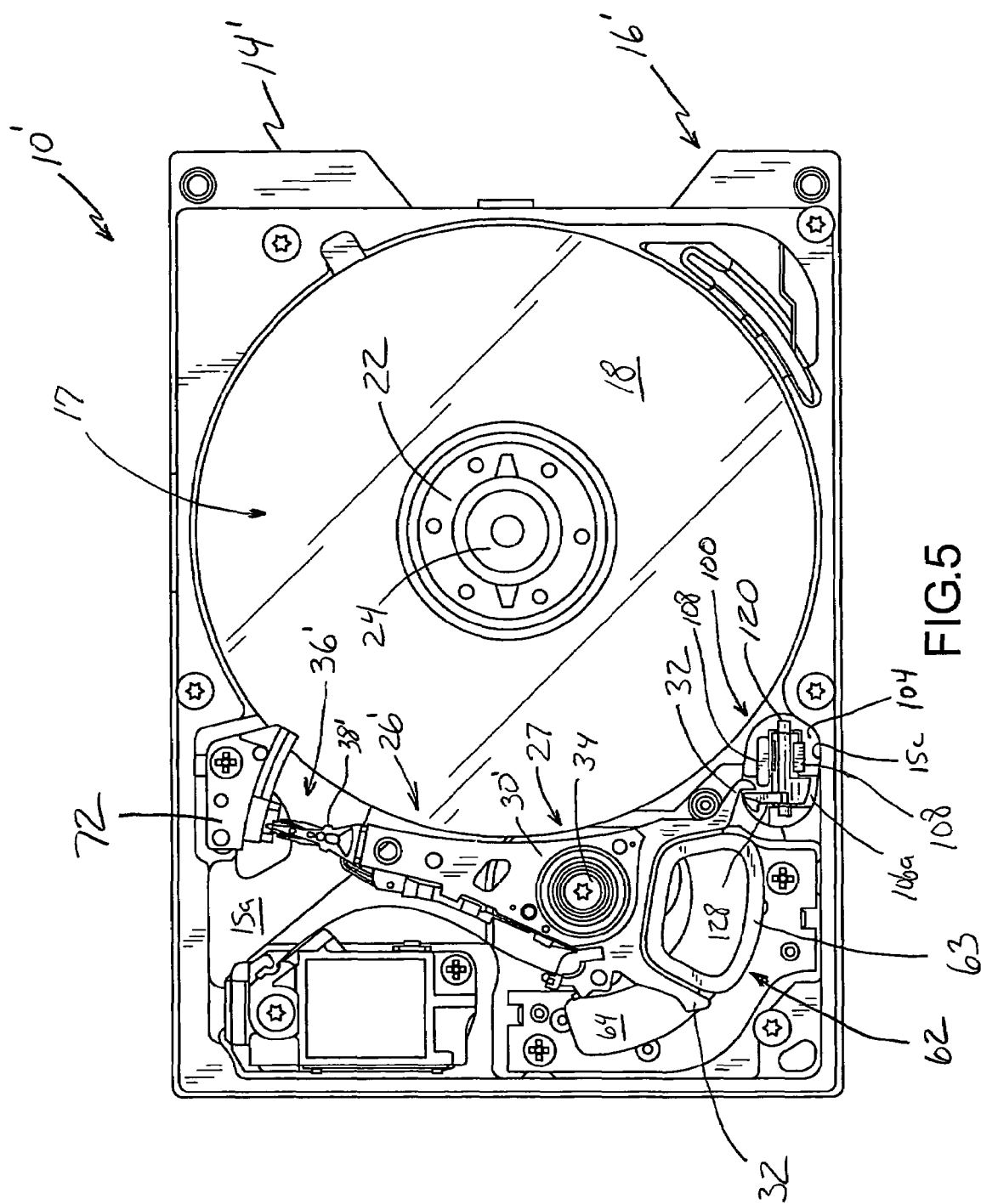
FIG. 5 is a top view of a disk drive that uses a first embodiment of a latch having at least one component disposed within the interior of the drive and at least one component disposed exteriorly of the disk drive.

FIG. 5 illustrates a variation of the disk drive 10 of FIGS. 1-4, and which is in the form of disk drive 10' that incorporates a head positioner assembly latch 100 having at least one component that is disposed within an interior space 17 of the drive 10' and at least one component that is disposed exteriorly of the interior space 17 of the disk drive 10'. Corresponding components between the embodiment of FIG. 5 and the prior art configuration of FIG. 1 are further identified by the same reference numbers. Components of the embodiment of FIG. 5 that differ in some respect from the corresponding component of the prior art configuration of FIG. 1 are identified by a "single prime" designation. The base plate 14' (part of the disk drive housing 16'), the head positioner assembly 26', the actuator arm 30', the head gimbal assembly 36', and the suspension 38' of the disk drive 10' of FIG. 5 differ from the corresponding component in the disk drive 10 of FIG. 1. However, such need not be the case. Each of these components may be in accordance with the discussion presented above as to their corresponding component in the disk drive 10 (e.g., the head positioner assembly 26', the actuator arm 30', the head gimbal assembly 36', and the suspension 38' may be of any appropriate configuration). For instance, the head positioner assembly 26' could be in the form of one or more individual actuator arms 30' that are each mounted on the pivot bearing 34, or the head positioner assembly 26' could be in the form of an actuator body that is mounted on the pivot bearing 34 and one or more actuator arms 30' or actuator arm tips could extend from this actuator body. In any case, the head positioner assembly 26' includes what they be characterized as a tail 32. The tail 32 thereby moves about the pivot bearing 34 along an arcuate path. What is of principal importance in relation to the disk drive 10' of FIG. 5 is the latch 100. The tail 32 of the head positioner assembly 26' cooperates with this latch 100 to control the position of the head positioner assembly 26' in at least some sense.

The head positioner assembly 26' is parked using a load/unload ramp 72 in the case of the disk drive 10' of FIG. 5. The latch 100 will attempt to retain the head positioner assembly 26' at least somewhere on the load/unload ramp 72 when in its latched position. The latch 100 is applicable to retaining the head positioner assembly 26' in its parked position, regardless of how/where the head positioner assembly 26' is parked. For instance, the latch 100 is also applicable to where the disk drive 10' is of the contact start/stop type, where each slider 42 of the disk drive 10' is parked on its corresponding data storage disk 18 versus on a load/unload ramp as is the case in the illustrated embodiment of FIG. 5.

Figure 6:
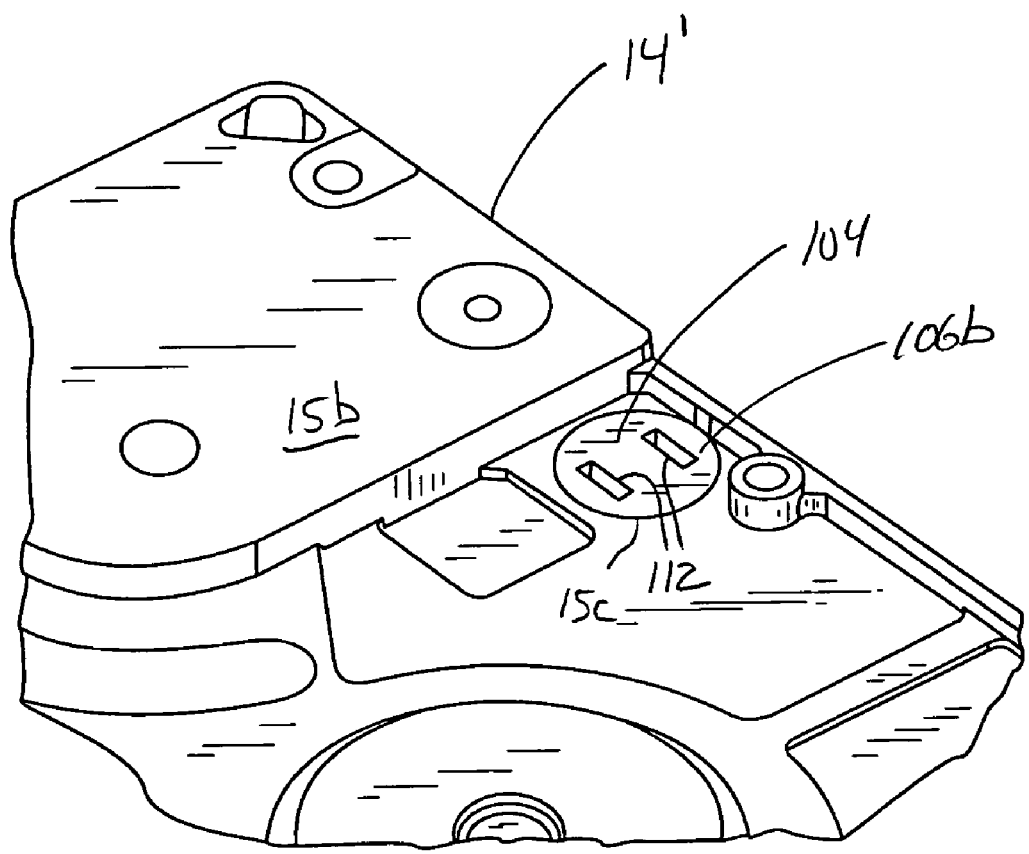
FIG. 6 is a bottom view of the base plate used by the disk drive of FIG. 5, and which illustrates a latch housing that is disposed within a latch housing aperture that extends through the base plate.

One or more components of the latch 100 are disposed within the interior or an interior space 17 of the disk drive 10'. The interior space 17 is collectively defined by the base plate 14' and an appropriate cover (e.g., cover 12). Referring now to FIGS. 5-6, the base plate 14' includes an interior surface 15a that interfaces with the noted interior space 17, as well as an oppositely disposed exterior surface 15b that is disposed outside of this interior space 17. The exterior surface 15b is thereby on an exterior of the disk drive 10'. A latch housing aperture or recess 15c extends from the interior surface 15a of the base plate 14' to its exterior surface 15b.

The latch 100 includes a latch housing 104 that is disposed within the above-noted latch housing aperture 15c and that is appropriately secured to the base plate 14'. The latch housing 104 thereby also includes an interior surface 106a that interfaces with the interior space 17 of the disk drive 10', as well as an oppositely disposed exterior surface 106b that is disposed on or interfaces with an exterior of the disk drive 10'. A pair of blind holes 112 exist within the latch housing 104 and are accessible from its exterior surface 106b as illustrated in FIG. 6. Generally, these blind holes 112 extend within a pair of hollow protrusions 108 (FIG. 5) that are disposed within the interior space 17 of the disk drive 10'. That is, the interior surface 116a of the latch housing 104 includes the noted pair of protrusions 108 and each such protrusion 108 may be of any appropriate size, shape, and/or configuration. The latch housing 104 could include a single blind hole that is accessible from its exterior surface 106b as well (not shown). Generally, the latch housing 104 may be of any appropriate size, shape and/or configuration to accommodate the configuration of the disk drive that incorporates the latch 100, to accommodate any one or more other components of the latch 100, or both.

Figure 7A:
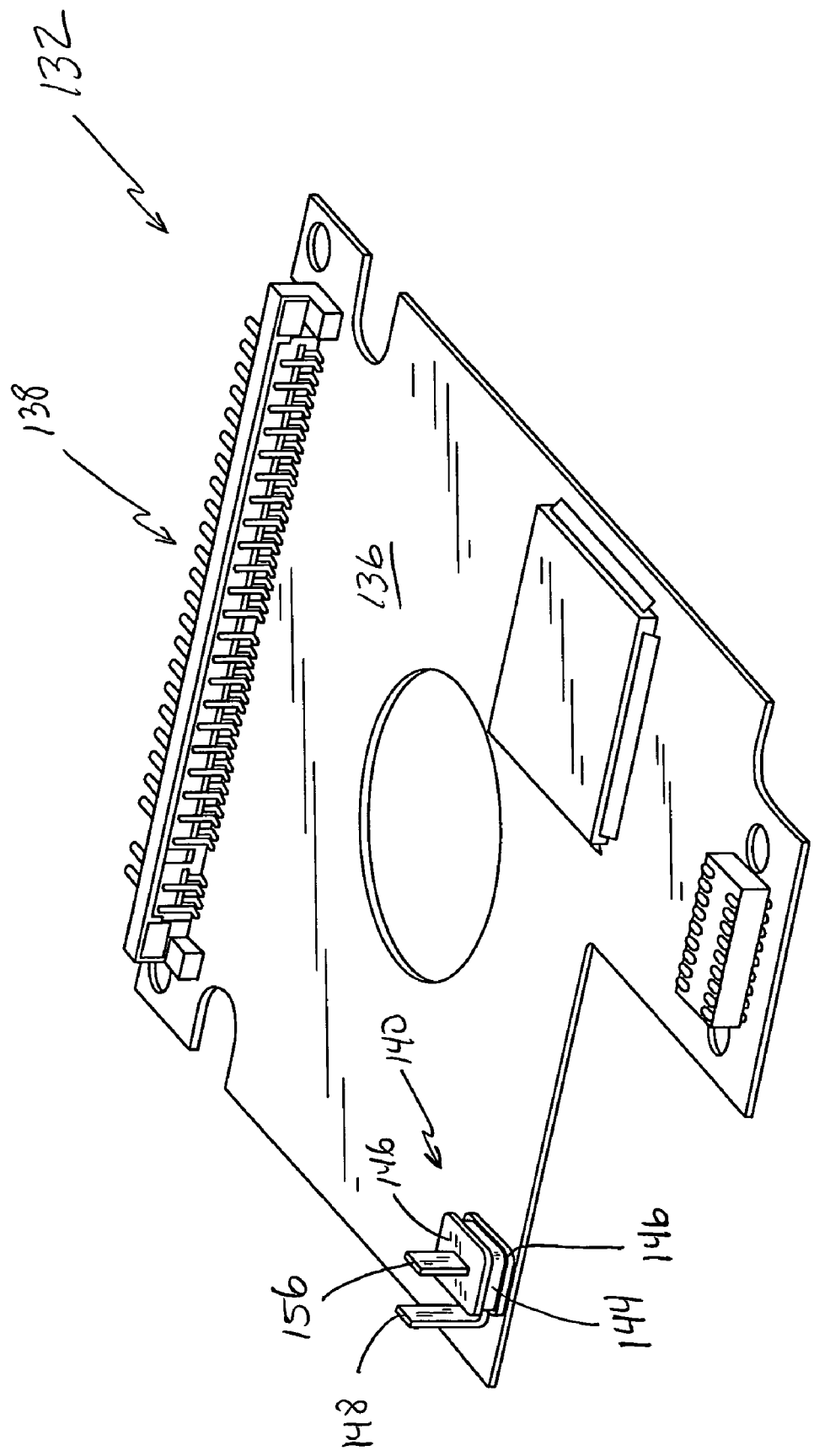
FIG. 7A is a perspective view of a latch assembly that is mounted on a printed circuit board, which in turn is mounted on the bottom of the base plate used by the disk drive of FIG. 5.
Figure 7B:
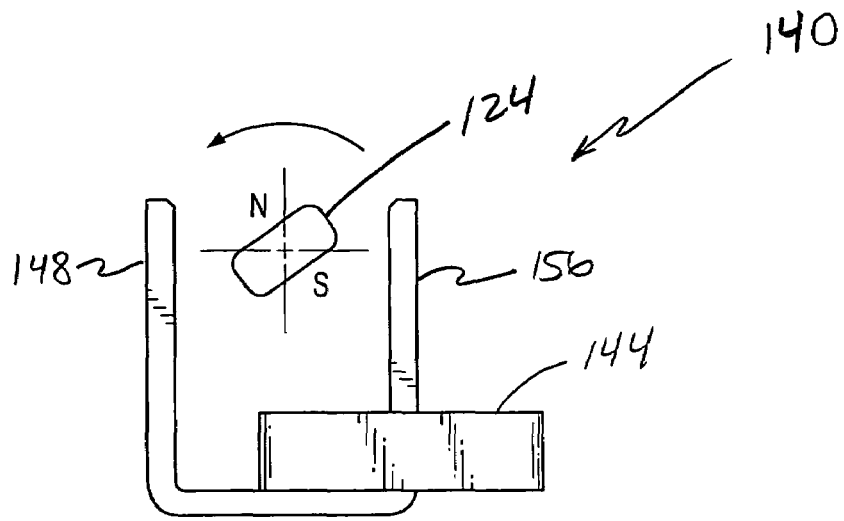
FIG. 7B is an end view of the poles and coil used by the latch assembly illustrated in FIG. 7A, along with a magnet that is associated with a rotatable latching element that is disposed inside the disk drive of FIG. 5.
Figure 7C:
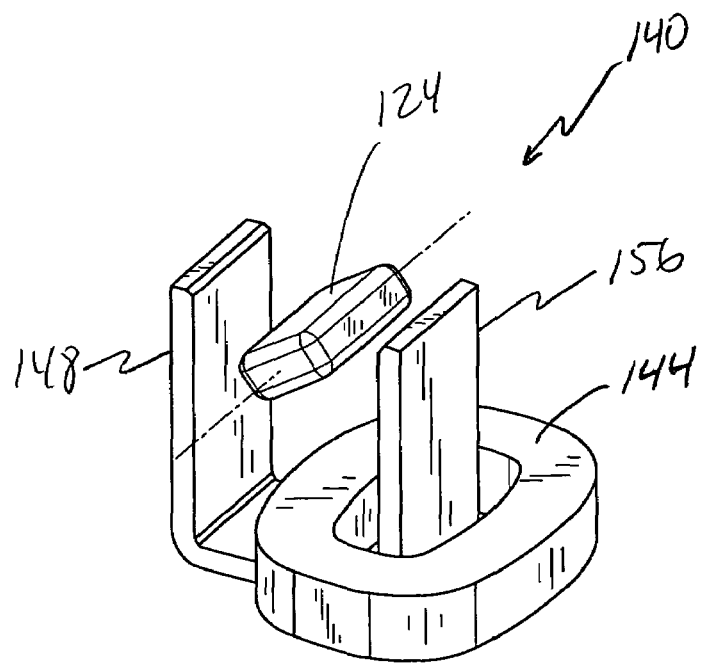
FIG. 7C is a perspective view of the arrangement illustrated in FIG. 7B.

Components of the latch 100 that are disposed outside of the interior space 17 of the disk drive 10' are illustrated in FIGS. 7A-C. FIG. 7A illustrates a printed circuit board assembly 132 that is mounted on the exterior surface 15b of the base plate 14' of the disk drive 10'. That is, the printed circuit board assembly 132 is disposed outside of the interior space 17 of the disk drive 10'. One component of the printed circuit board assembly 132 is of course a printed circuit board 136. Various electrical components may be fabricated and/or mounted on the printed circuit board 136, and that are used by the disk drive 10'. Typically, one or more electrical connectors 138 are appropriately mounted on the printed circuit board 136 for providing electrical signals to/receiving electrical signals from the printed circuit board 136.

Continuing to refer to FIGS. 7A-C, the latch 100 includes what may be characterized as a second latch element or a latch assembly 140 that is mounted on the printed circuit board 136 in any appropriate manner (e.g., surface mounted), and that is thereby part of the printed circuit board assembly 132. Components of the latch assembly 140 include a coil 144, a first pole 148, and a second pole 156 that is spaced from and appropriately interconnected with the first pole 148. Generally, the poles 148, 156 extend within the latch housing 104, and are isolated from the interior space 17 of the drive 10' by the latch housing 104. In the illustrated embodiment, the poles 148, 156 each extend within a corresponding blind hole 112 of the latch housing 104 and are thereby isolated from the interior space 17 of the disk drive 10' by the latch housing 104, as is the coil 144. The poles 148, 156 could extend into a common blind hole of the latch housing 104 that is accessible from its exterior surface 106b as well (not shown). The coil 144 may be wound on a bobbin 146 as shown in FIG. 7A, or wound without a bobbin as shown in FIGS. 7B-C. In either case, the components of the latch assembly 140 are assembled with additional materials and/or components as required to form a single structure which is mounted onto and makes an electrical connection from the coil 144 to the printed circuit board 136.

A permanent magnet 124 is disposed between the first pole 148 and the second pole 156 or otherwise in a position so as to be able to interact with the poles 148, 156, but is located within the interior space 17 of the disk drive 10' as will be discussed in more detail below. The permanent magnet 124 may be formed from any appropriate material or combination of materials. The coil 144, first pole 148, and second pole 156 generally define/function as an electromagnet for changing the rotational position of the magnet 124. In this regard, an electrical signal may be provided to the coil 144 to change the state of the electromagnet (e.g., to either "turn on" or "turn off" the electromagnet), to thereby change the rotational position of the magnet 124 relative to the poles 148, 156 and the state of the latch 100. The latch 100 may be configured such that it is in its unlatched position when no electrical signal is being provided to the latch 100, and such that it is in its latched position when an electrical signal is being provided to the latch 100, or vice versa. Typically, it would be desirable for the latch 100 to be configured such that it is in its latched position when there is no electrical signal (e.g., to accommodate having the latch 100 be in its latched position during shipment and when no electrical power is available). Moreover, a preferred implementation is for the latch 100 to be in its latched position anytime the head positioner assembly 26' is in its parked position. In one embodiment, the magnet 124 rotates through an angle of about 20 degrees in moving between its two positions. Other angles of rotation may be appropriate.

Figure 8A:
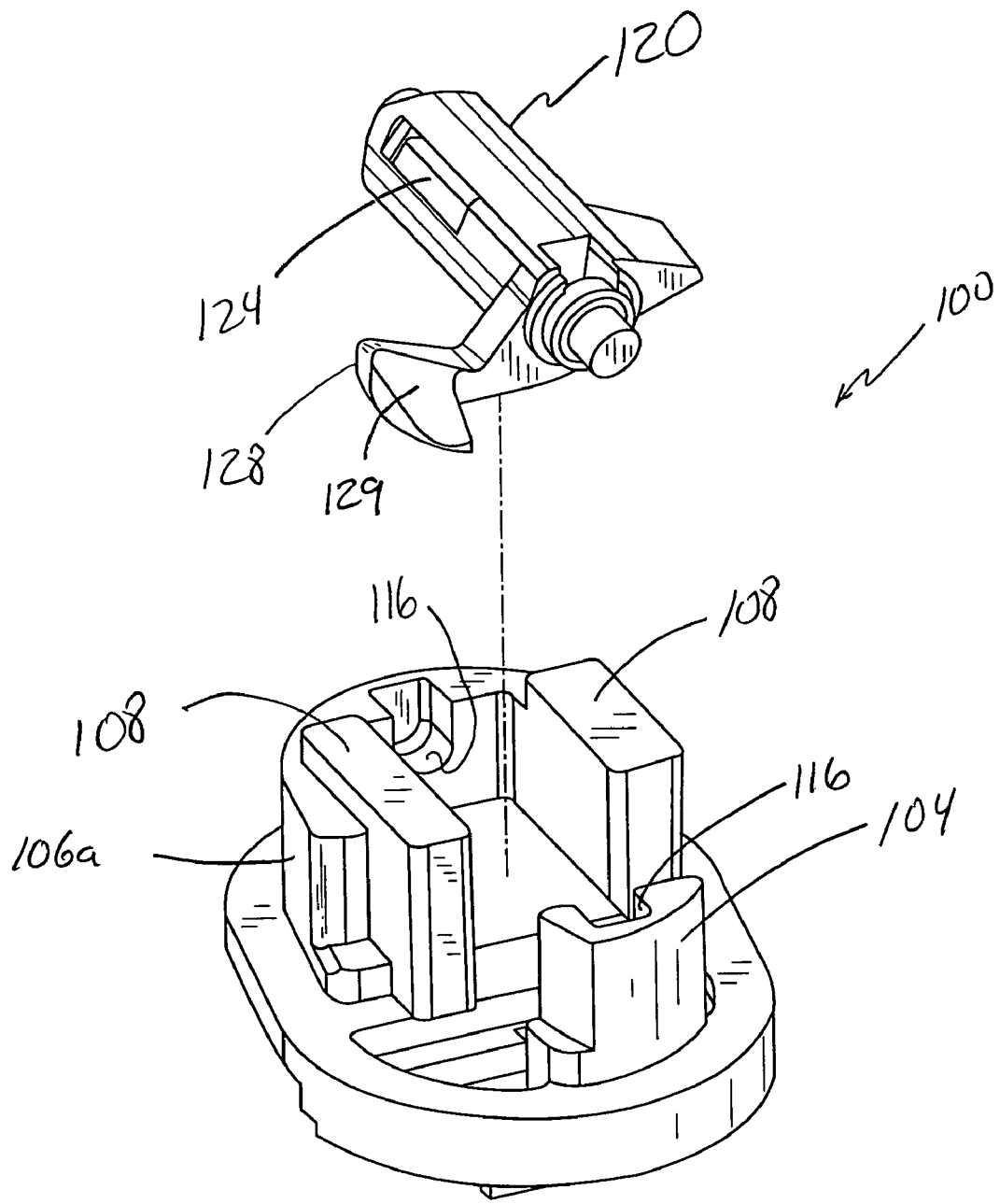
FIG. 8A is a perspective view of the portion of the latch housing of FIG. 6 that extends within the disk drive of FIG. 5, that receives the poles illustrated in FIGS. 7A-C, and that supports a rotatable latching element within the drive (shown exploded from the latch housing in FIG. 8A).
Figure 8B:
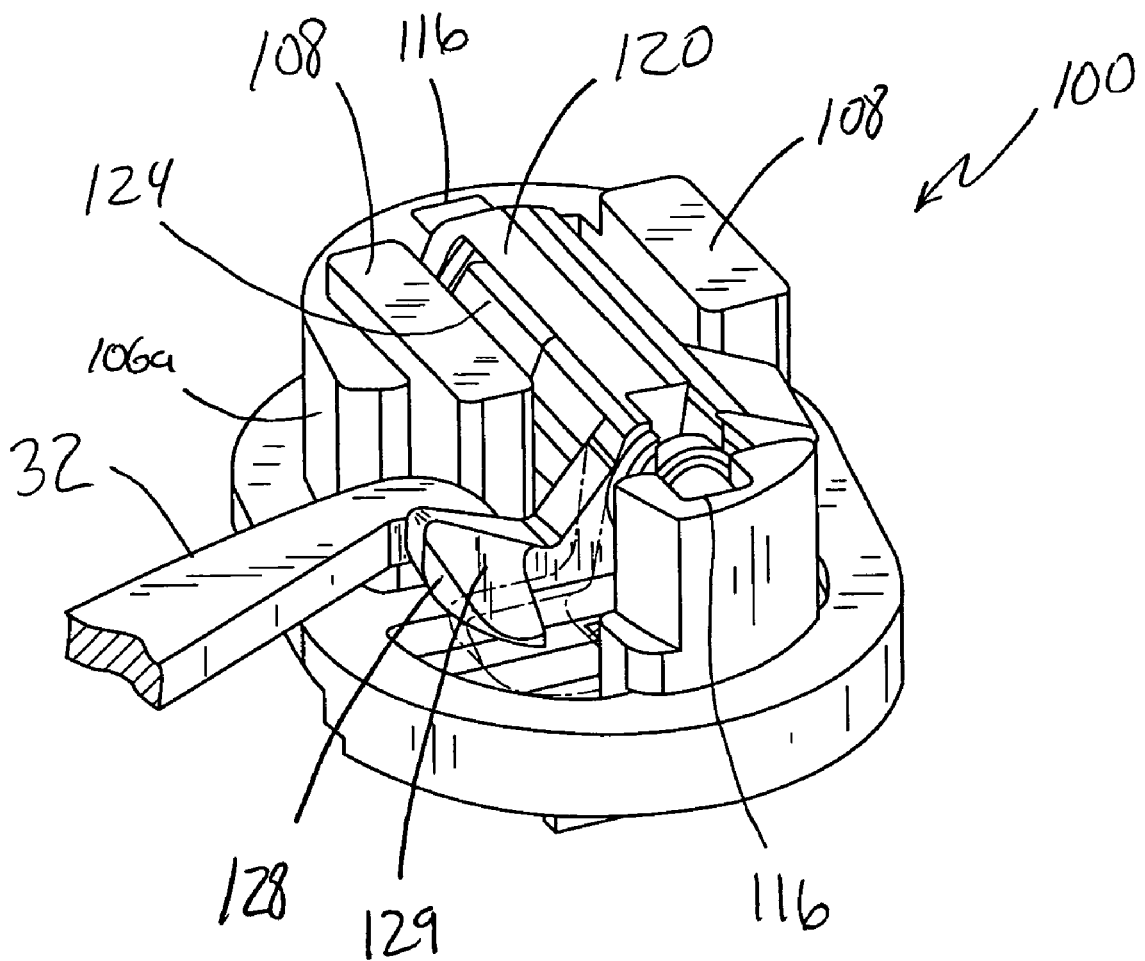
FIG. 8B is a perspective view of the rotatable latching element seated within the latch housing and in position to engage the head positioner assembly of the disk drive of FIG. 5.

At least one component of the latch 100 is also disposed within the interior space 17 of the disk drive 10'. Referring now to FIGS. 5 and 8A-B, the latch 100 also includes what may be characterized as a first latch element or armature 120 that is disposed within the interior space 17 of the disk drive 10'. The above-noted magnet 124 is appropriately mounted on or otherwise integrated with the armature 120 in any appropriate manner. The latch housing 104 includes a pair of armature notches 116 on its interior surface 106a to receive the ends of the armature 120 and that allow the armature 120 to rotate relative to the latch housing 104. The armature 120 also includes a stop 128 that is appropriately mounted on or otherwise integrated with the armature 120 in any appropriate manner. The stop 128 may be of any appropriate size, shape, and/or configuration. Any configuration of the armature 120 may be utilized that allows for a change in position of the magnet 124 to induce a corresponding change in position of the stop 128. In the illustrated embodiment, the armature 120, magnet 124, and stop 128 rotate together or collectively in response to a change in state of the latch assembly 140 (e.g., the exteriorly located electromagnet).

When the latch 100 is disposed in its unlatched position, the magnet 124 and stop 128 are in a position such that the stop 128 is disposed outside of the path of the tail 32 of the head positioner assembly 26' (indicated by the dashed outline of the stop 128 in FIG. 8B). This then allows the head positioner assembly 26' to move from the parked position illustrated in FIG. 5, to a position where each slider 42 used by the head positioner assembly 26' is disposed above or below its corresponding data storage disk 18 when the base plate 14' is disposed on a horizontal surface.

In the case where the head positioner assembly 26' is in its parked position, the latch 100 will typically be in its latched position (indicated by the solid line of the stop 128 in FIG. 8B) (the unlatched position of the latch 100 being indicated by the dashed outline of the stop 128 in FIG. 8B). Preferably, any time the head positioner assembly 26' is in its parked position, the latch 100 is maintained in its latched position. Only when the head positioner assembly 26' is being moved out of its parked position is the latch 100 moved to its unlatched position to allow the tail 32 of the actuator 27 to pass the stop 128 of the armature 120.

When the latch 100 is in the latched position, the stop 128 is disposed within the path of the tail 32 of the head positioner assembly 26'. Therefore, if the head positioner assembly 26' attempts to move clockwise in the view illustrated in FIG. 5, the tail 32 of the head positioner assembly 26' will engage the stop 128 of the latch 100 to thereafter restrain the head positioner assembly 26' from moving in the noted clockwise direction. It should be appreciated that the stop 128 could be located such that the head positioner assembly 26' is allowed to move a certain amount before engaging the stop 128, or could be located such that the head positioner assembly 26' is not allowed to move at all or only minimally when the latch 100 is in its latched position (e.g., the parked position of the head positioner assembly 26' could be such that disposing the stop 128 in the latched position more or less establishes contact between the stop 128 and the tail 32 of the head positioner assembly 26' of the disk drive 10').

Any appropriate way of controlling the latch 100 may be employed. For instance, the latch 100 may operate on a command from the processor used by the disk drive 10'. This command may be issued for any number of reasons. In one embodiment, the latch 100 is energized to its unlatched position only long enough so that the tail 32 of the actuator 27 can pass by (either in or out) without contacting the armature 120. However, the armature 120 and the tail 32 of the actuator 27 are preferably shaped so that an unlatched actuator 27 can push its way past the armature 120 into a latched position, which may be required if power is lost (which directs the back emf of the spindle motor to the actuator 27, to in turn rotate the actuator 27 to its parked position). Depending on the drive configuration, the actuator 27 may be sent to the parked position for any or all the following reasons: to power down the drive; for a power save mode; for a shock event; or due to a detected free fall. In any case, an inclined surface 129 on the stop 128 allows the tail 32 to push past the stop 128 into the latched position even if the latch 100 has not been energized. Alternatively, an inclined engagement surface can be on the tail 32, or there can be inclined surfaces on both the stop 128 and tail 32. Moreover, the preferred orientation of the axis of rotation of the latch armature 120 is at 90 degrees to the axis of rotation of the head positioner assembly 26' so that a shock or impact that imparts a rotational acceleration to the drive 10' may tend to rotate the armature 120 to the unlatched position or it may tend to rotate the head positioner assembly 26' toward the disk 18, but can't do both at the same time. Typically, both the armature 120 and head positioner assembly 26' are balanced to resist linear shock.

Figure 9A:
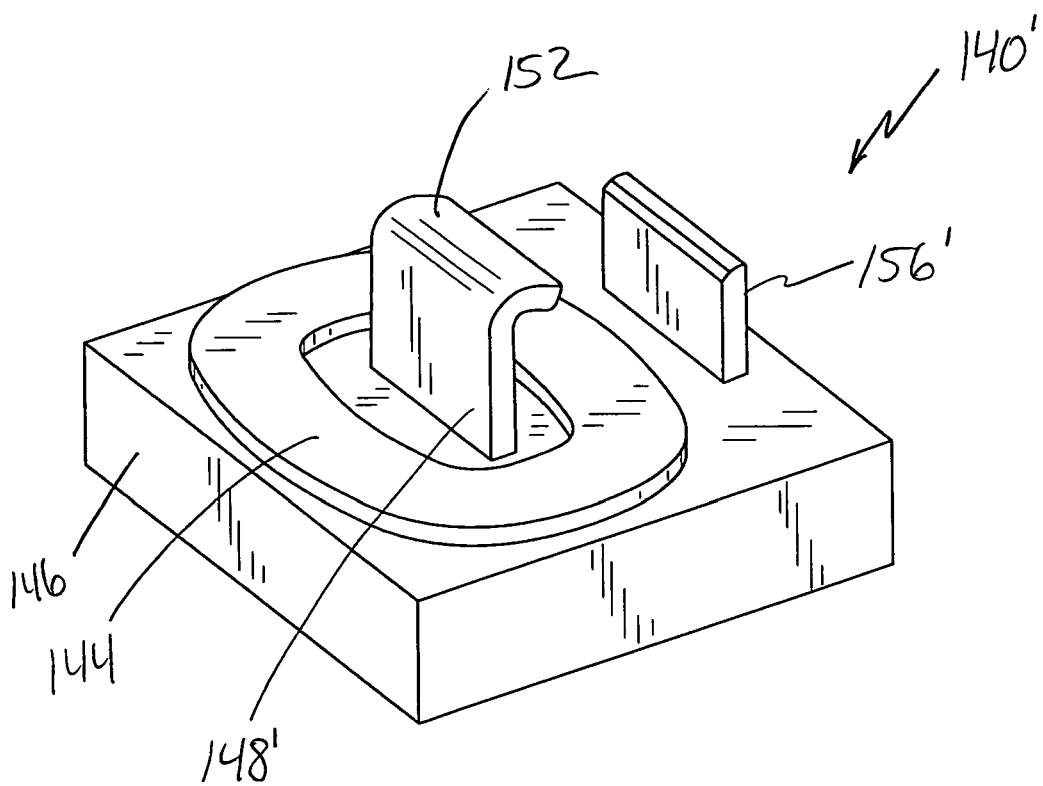
FIG. 9A is a perspective view of components of a second embodiment of a latch (coil and poles) that may be used by the disk drive of FIG. 5 and that are disposed exteriorly of the disk drive, where this coil and poles would be mounted on a printed circuit board in the same general manner as illustrated in FIG. 7A.
Figure 9B:
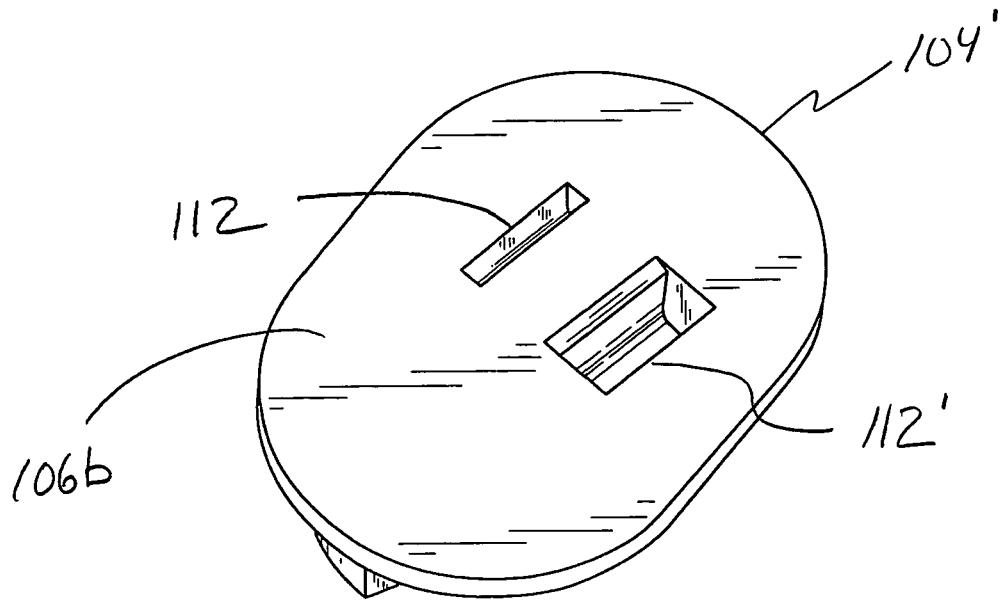
FIG. 9B is a bottom view of a latch housing for the second embodiment of a latch, and that receives the poles illustrated in FIG. 9A.
Figure 9C:
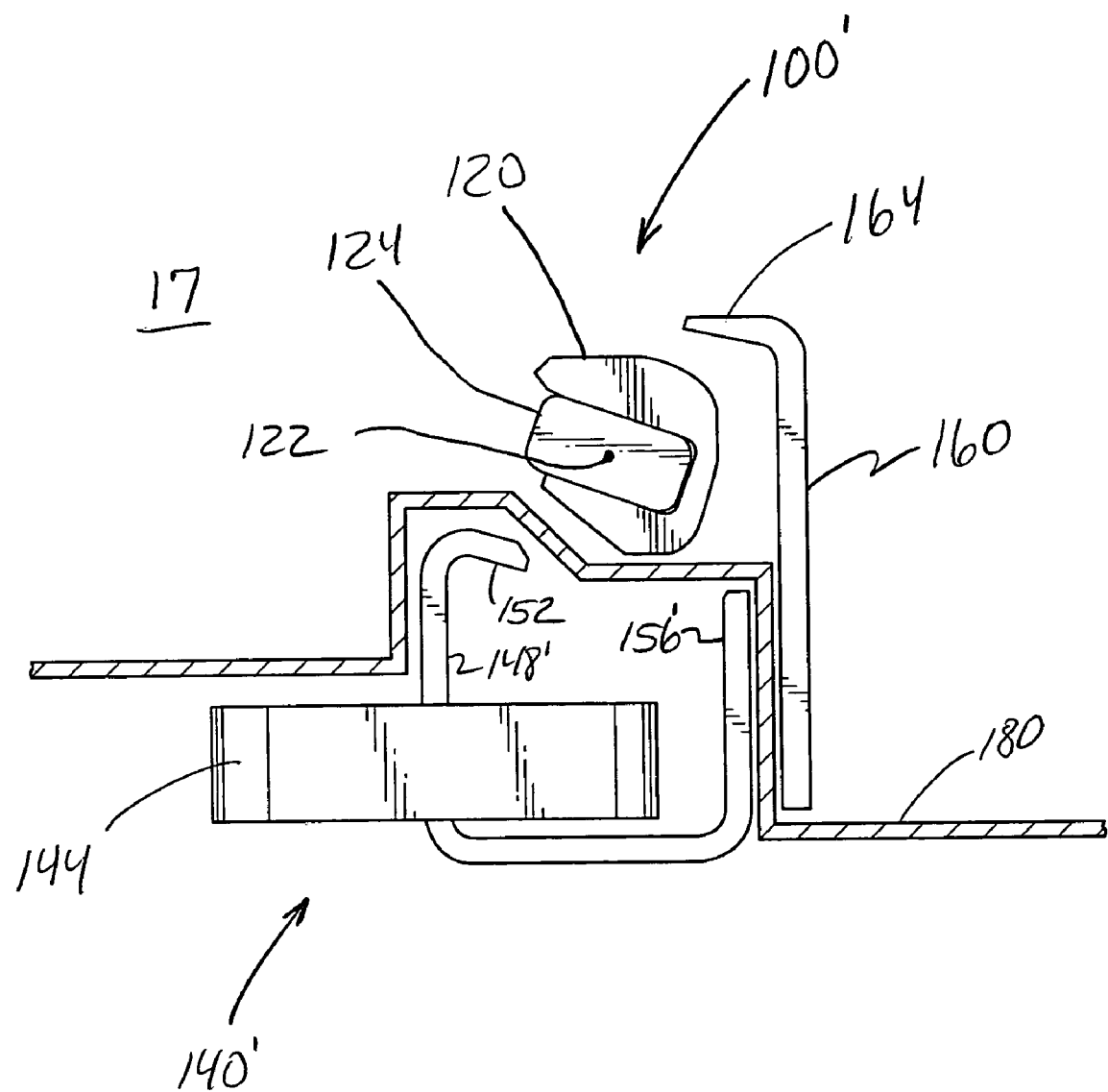
FIG. 9C is a schematic that illustrates the coil and poles illustrated in FIG. 9A, as well as a rotatable latching element with a magnet for the second embodiment of a latch, and further that schematically illustrates the isolation of the coil and poles from the latching element that is located within the interior of the drive.

Another embodiment of a head positioner assembly latch is illustrated in FIGS. 9A-C, is identified by reference numeral 100', and has at least one component disposed within the interior of the drive and at least one component disposed exteriorly of the drive (boundary 180 in FIG. 9C schematically illustrating the separation between an interior space 17 of a disk drive that incorporates the latch 100' and the exterior of this disk drive). Corresponding components between the embodiments of latches illustrated in FIGS. 5-7C and FIGS. 9A-F are identified by the same reference numbers. Corresponding components of these latches that differ in some respect are identified by a "single prime" designation.

There are a number differences between the latch 100 of FIGS. 5-7C and the latch 100' of FIGS. 9A-C and 9F. Initially, the first pole 148' of the latch assembly 140' includes a curved upper portion 152. As such, the latch housing 104' used by the latch 100' includes an enlarged blind hole 112' for receiving this first pole 148' (FIG. 9B). As noted above with regard to the latch 100, the latch housing 104' could include a single blind hole that is accessible from its exterior surface 106b for receiving the poles 148', 156' (not shown). Generally, the latch housing 104' may be of any appropriate size, shape and/or configuration to accommodate the configuration of the disk drive that incorporates the latch 100', to accommodate any one or more other components of the latch 100', or both.

Figure 9D:
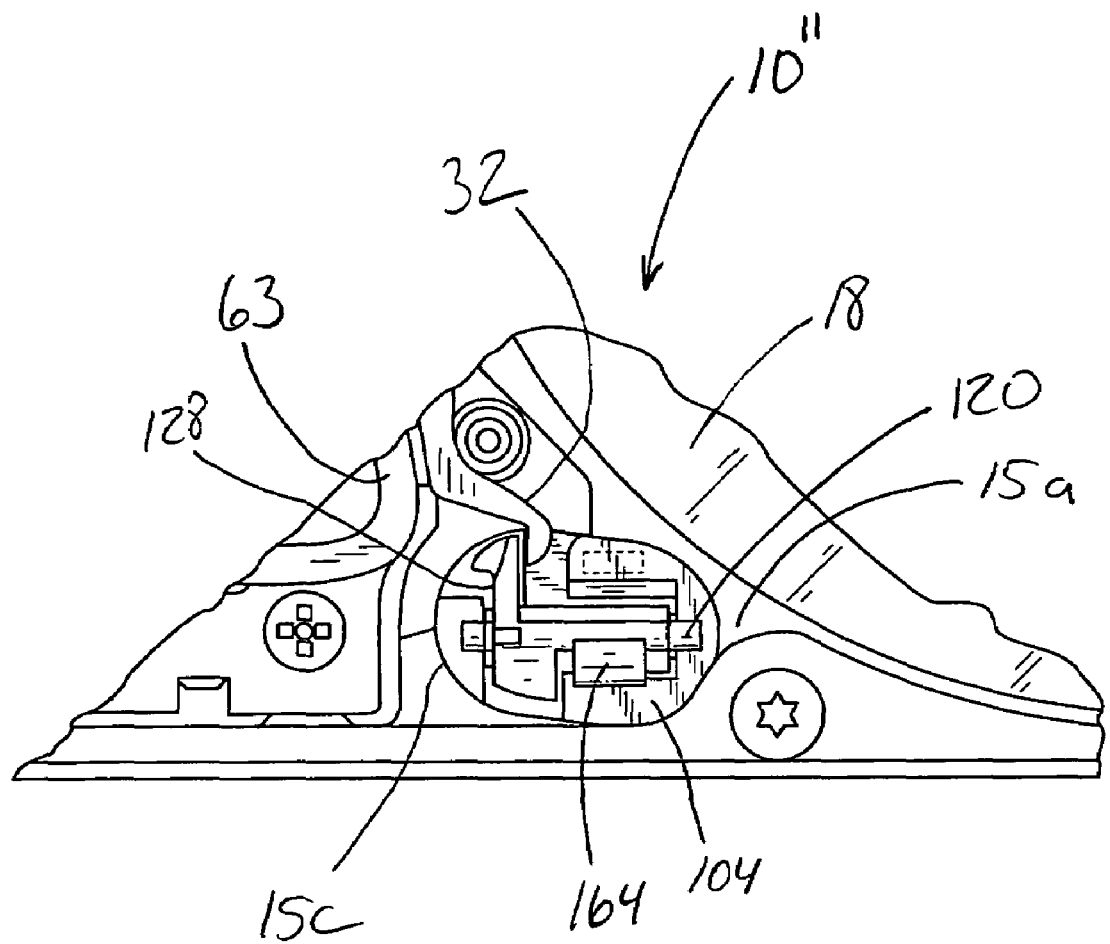
FIG. 9D is a top view of a portion of the disk drive of FIG. 5, adapted to include the second embodiment of a latch illustrated in FIGS. 9A-C.
Figure 9E:
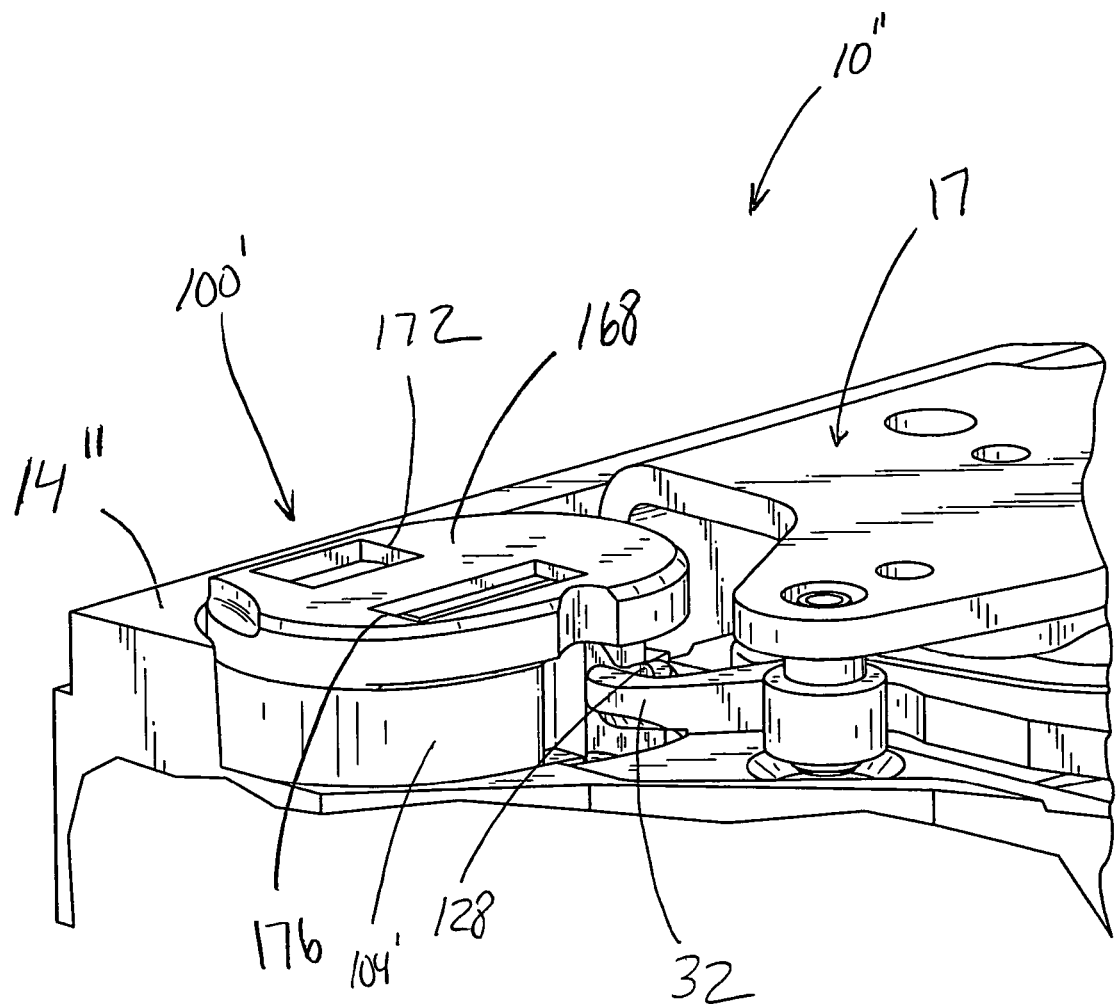
FIG. 9E is a cutaway, perspective view of the disk drive of FIG. 5, adapted to include the second embodiment of a latch illustrated in FIGS. 9A-C.

As in the case of the latch 100, the poles 148', 156' of the latch 100' extend within the latch housing 104', and are isolated from the interior space of the drive by the latch housing 104' (e.g., interior space 17 of drive 10" of FIGS. 9D-E). However, the first pole 148' and second pole 156' of the latch assembly 140' of FIGS. 9A-F are also disposed in different positions relative to the armature 120 than in the case of the latch 100 of FIGS. 5-7C. Once again, the armature 120 is disposed within the interior space of the disk drive (e.g., interior space 17 of drive 10" of FIGS. 9D-E). As illustrated in FIG. 9C, the first pole 148' is disposed at a lower elevation relative to the armature 120 than in the case of the latch 100 of FIGS. 5-7C. Generally, the uppermost extreme of the first pole 148' (defined by the curved upper portion 152 noted above) is disposed at a lower elevation than a rotational axis 122 of the armature 120 when the drive's base plate (e.g., base plate 14" in FIGS. 9D-E) is disposed on a horizontal surface (the orientation illustrated in FIG. 9C). That is, the entirety of the first pole 148' is disposed at a lower elevation than the rotational axis 122 of the armature 120 when the base plate 14 (e.g., base plate 14" in FIGS. 9D-E) is disposed on a horizontal surface. Similarly, the uppermost extreme of the second pole 156' is also disposed at a lower elevation than the rotational axis 122 of the armature 120 when the drive's base plate (e.g., base plate 14" in FIGS. 9D-E) is disposed on a horizontal surface. Therefore, the entirety of the second pole 156' is also disposed at a lower elevation than the rotational axis 122 of the armature 120 when the drive's base plate (e.g., base plate 14" in FIGS. 9D-E) is disposed on a horizontal surface.

The latch assembly 140' of the latch 100' would be mounted on the printed circuit board 136 in the same manner as the latch assembly 140 discussed above (FIG. 7A), and is thereby still disposed exteriorly of the disk drive that incorporates the latch 100'. FIG. 9C again schematically illustrates a boundary 180 between an interior space 17 of a disk drive that incorporates the latch 100' and its exterior. This boundary 180 may be of any appropriate size, shape, and/or configuration. The latch 100' of FIGS. 9A-C also includes a third pole 160 that is disposed within the interior space 17 of a disk drive that incorporates the latch 100' so as to be adjacent to the second pole 156'. The third pole 160 includes a curved upper portion 164 that is disposed at a higher elevation than the rotational axis 122 of the armature 120 when the drive's base plate (e.g., base plate 14" in FIGS. 9D-E) is disposed on a horizontal surface (the orientation illustrated in FIG. 9C).

Figure 9F:
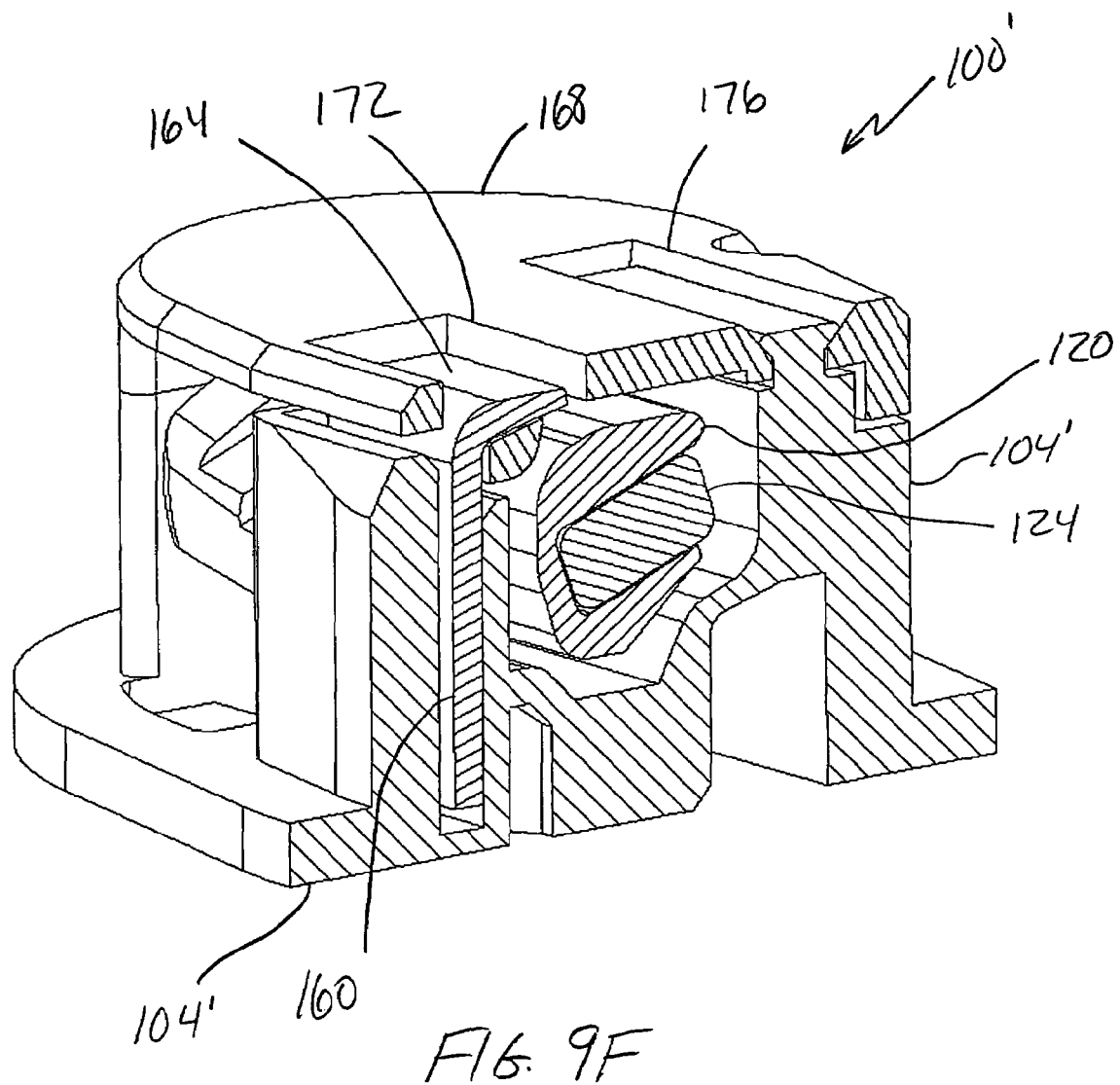
FIG. 9F is a perspective, cross-sectional view of the latch housing and internally disposed components of the latch illustrated in FIGS. 9A-C.

FIGS. 9D-E illustrate the latch 100' being incorporated into a disk drive 10". The discussion presented above with regard to the disk drive 10 of FIGS. 1-4 is equally applicable to the disk drive 10" of FIGS. 9D-E. What is of principal importance in relation to the configuration of the disk drive 10" is that the disk drive 10" utilizes the latch 100'. FIG. 9E illustrates the latch 100' in its latched position. Once again, the stop 128 of the latch 100' is disposed within the path of the tail 32 of the head positioner assembly 26' when the latch 100' is in its latched position. FIGS. 9E and 9F also illustrate that the latch 100' may also include a cover 168 that is mounted on the latch housing 104' and that may be used to retain the armature 120 in a desired position. The latch 100 of FIGS. 5-7C could also include such a cover. The cover 168 may be detachably engaged with the latch housing 104', for instance by a snap-lock type interconnection. In the illustrated embodiment, the cover 168 includes an aperture 172 that extends completely through the cover 168 and that accommodates the curved upper portion 164 of the above-noted third pole 160. The cover 168 further includes an aperture 176 that also extends through the cover 168. The aperture 176 in the cover 168 sits over a boss on the latch housing 104'. This boss is heat-staked to hold down that side of the cover 168. The third pole 160 is assembled by dropping it through the aperture 172 in the cover 168 and pressing it onto the latch housing 104'. A feature in the cover 168 is captured by the curved upper portion 164 of the third pole 160 to hold down that side of the cover 168.

The latch 100 of FIGS. 5-7C and the latch 100' of FIGS. 9A-F offer a number of advantages. One is that the coil 144 is located outside of the disk drive, thereby alleviating a related outgassing concern. That is, when a coil for a solenoid-type head positioner assembly latch is disposed within the drive, there is an outgassing concern. Another advantage is that the latches 100/100' are integrated with the disk drive in a manner that facilitates replacement of one or more of its individual components, and without having to scrap an expensive disk drive assembly that incorporates the latch 100/100'. Electrically interconnecting the coil 144 with the printed circuit board 136 is also much simpler in the case of the latches 100/100' (surface mounting the latch assembly 140/140' on the printed circuit board 136, versus routing wires through grommets in holes drilled in the base plate, potting the opening to seal the holes, and then soldering leads to a connector or flex circuit that connects to the printed circuit board—which is a very labor intensive process). An extremely high level of cleanliness is generally required of the interior space 17, that is not required of the printed circuit board assembly 132. Components on the printed circuit board assembly 132 can use less expensive materials, less expensive finishing and less expensive packaging, and furthermore require a less rigorous cleaning procedure.

In addition to the foregoing, the coil 144 of the latches 100, 100' can be replaced without having to gain access to the interior space 17 of the drive. The coil 144 and poles 148, 156 of the latch 100 may be uninstalled simply by disconnecting its printed circuit board assembly 132 from its base plate 14'—as would be the case with the coil 144 and poles 148', 156' of the latch 100'. The coil 144 and poles 148' 156' of the latch 100, along with the coil 144 and poles 148', 156' of the latch 100', are also disposed outside of the interior space 17 of the drive.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A disk drive, comprising:
   a disk drive housing;
   an interior space defined at least in part by said disk drive housing;
   a head positioner assembly disposed within said interior space;
   a computer-readable storage medium disposed within said interior space; and
   a latch associated with said head positioner assembly and comprising first and second latch elements, wherein said first latch element is disposed within said interior space and is engageable with said head positioner assembly, wherein said second latch element is disposed outside of said interior space, and wherein said second latch element comprises a coil, a first pole, and a second pole, wherein an interior surface that interfaces with said interior space comprises a pair of hollow protrusions, and wherein said first and second poles are received within said pair of hollow protrusions.

2. The disk drive of claim 1, wherein said first latch element is movable and comprises a stop, wherein said first latch element is movable into a position where said stop is disposed within a path of said head positioner assembly to engage said head positioner assembly and thereafter restrain said head positioner assembly from moving in a first direction.

3. The disk drive of claim 2, wherein said first latch element comprises a magnet.

4. The disk drive of claim 1, wherein said first latch element comprises an rotatable armature, a magnet associated and rotatable with said armature, and a stop associated and rotatable with said armature, wherein said armature is rotatable into a position where said stop is disposed within a path of said head positioner assembly to engage said head positioner assembly and thereafter restrain said head positioner assembly from moving in a first direction.

5. The disk drive of claim 1, further comprising a printed circuit board that is disposed outside of said interior space, wherein said second latch element is mounted on said printed circuit board.

6. The disk drive of claim 1, further comprising a printed circuit board that is disposed outside of said interior space, wherein said coil is mounted on said printed circuit board.

7. The disk drive of claim 1, further comprising a printed circuit board that is disposed outside of said interior space, wherein said coil, said first pole, and said second pole are mounted on said printed circuit board.

8. The disk drive of claim 1, wherein at least a portion of said first latch element is disposed between said pair of hollow protrusions that receive said first and second poles.

9. The disk drive of claim 1, further comprising a latch housing aperture in said disk drive housing and a latch housing that is disposed within said latch housing aperture and that comprises said pair of hollow protrusions, wherein said pair of hollow protrusions are in the form of first and second blind holes that are accessible from outside of said interior space.

10. The disk drive of claim 9, wherein said first latch element is supported by said latch housing within said interior space.

11. The disk drive of claim 9, wherein said first latch element is rotatably supported by said latch housing and comprises a magnet and a stop, wherein said first latch element is rotatable into a position where said stop is disposed within a path of said head positioner assembly to engage said head positioner assembly and thereafter restrain said head positioner assembly from moving in a first direction.

12. The disk drive of claim 1, wherein said first and second poles are of a common length.

13. The disk drive of claim 1, wherein said first and second poles are of different lengths.

14. The disk drive of claim 1, wherein said first pole comprises a curved upper portion.

15. The disk drive of claim 14, wherein said second pole is shorter than said first pole.

16. The disk drive of claim 14, further comprising a third pole disposed within said interior space and adjacent one of said pair of hollow protrusions that receives said second pole protrudes.

17. The disk drive of claim 16, wherein said curved upper portion of said first pole is disposed at a lower elevation that a rotational axis of said first latch element when said disk drive is in a horizontal orientation, and wherein said third pole comprises a curved upper portion that is disposed at a higher elevation than said rotational axis of said first latch element when said disk drive is in said horizontal orientation.

18. A disk drive, comprising:
  a disk drive housing that comprises a latch housing aperture;
  an interior space defined at least in part by said disk drive housing;
  a head positioner assembly disposed within said interior space;
  a computer-readable storage medium disposed within said interior space;
  a latch housing that is disposed within said latch housing aperture and
  a latch comprising a coil, first and second poles, and a movable first latch element, wherein said first and second poles extend within said latch housing, and are isolated from said interior space by said latch housing, and wherein said first latch element is disposed within said interior space at a location so as to be able to interact with said first and second poles, wherein said latch housing comprises first and second blind holes that are accessible from outside of said interior space, wherein said first and second poles extend within said first and second blind holes respectively.

19. The disk drive of claim 18, wherein said first latch element comprises a stop, wherein said first latch element is movable into a position where said stop is disposed within a path of said head positioner assembly to terminate further movement of said head positioner assembly in a first direction.

20. The disk drive of claim 19, wherein said first latch element comprises a magnet.

21. The disk drive of claim 18, wherein said first latch element comprises an rotatable armature, a magnet associated and rotatable with said armature, and a stop associated and rotatable with said armature, wherein said armature is rotatable into a position where said stop is disposed within a path of said head positioner assembly to terminate further movement of said head positioner assembly in a first direction.

22. The disk drive of claim 18, further comprising a printed circuit board, wherein a latch assembly comprises said coil, said first pole, and said second pole, wherein said latch assembly is mounted on said printed circuit board, and wherein said printed circuit board is interconnected with said disk drive housing outside of said interior space.

23. The disk drive of claim 18, wherein said coil is disposed outside of said interior space.

24. The disk drive of claim 18, further comprising a printed circuit board that is disposed outside of said interior space, wherein said coil is mounted on said printed circuit board.

25. The disk drive of claim 18, wherein said first latch element is movably supported by said latch housing within said interior space.

26. The disk drive of claim 18, wherein said first latch element is rotatably supported by said latch housing within said interior space and comprises a magnet and a stop, wherein said first latch element is rotatable into a position where said stop is disposed within a path of said head positioner assembly to engage said head positioner assembly and thereafter restrain said head positioner assembly from moving in a first direction.

27. The disk drive of claim 18, wherein said first and second poles are of a common length.

28. The disk drive of claim 18, wherein said first and second poles are of different lengths.

29. The disk drive of claim 18, wherein said first pole comprises a curved upper portion.

30. The disk drive of claim 29, wherein said second pole is shorter than said first pole.

31. The disk drive of claim 29, further comprising a third pole disposed within said enclosed space and adjacent to where said second pole protrudes into said latch housing.

32. The disk drive of claim 31, wherein said curved upper portion of said first pole is disposed at a lower elevation than a rotational axis of said first latch element when said disk drive is in a horizontal orientation, and wherein said third pole comprises a curved upper portion that is at a higher elevation than said rotational axis of said first latch element when said disk drive is in said horizontal orientation.

33. A disk drive, comprising:
a disk drive housing that that comprises a latch housing aperture;
an interior space defined at least in part by said disk drive housing;
a head positioner assembly disposed within said interior space;
a computer-readable storage medium disposed within said interior space;
a printed circuit board mounted on said disk drive housing outside of said interior space;
a latch housing that is disposed within said latch housing aperture; and
a latch comprising a latch assembly and a first latch element, wherein said latch assembly is mounted on said printed circuit board and comprises a coil, a first pole, and a second pole, wherein said first and second poles extend within said latch housing, wherein said first latch element is rotatably supported by said latch housing and is located within said interior space, wherein said first latch element comprises a magnet, and wherein said first latch element is at a location within said interior space so as to be able to interact with said first and second poles.

34. A disk drive, comprising:
a disk drive housing;
an interior space defined at least in part by said disk drive housing;
a head positioner assembly disposed within said interior space;
a computer-readable storage medium disposed within said interior space;
a printed circuit board mounted to said disk drive housing outside of said interior space; and
a latch associated with said head positioner assembly and comprising first and second latch elements, wherein said first latch element is disposed within said interior space and is engageable with said head positioner assembly, wherein said second latch element is mounted on said printed circuit board, and wherein said second latch element comprises a coil, a first pole, and a second pole, wherein an interior surface that interfaces with said interior space comprises a pair of hollow protrusions, and wherein said first and second poles are received within said pair of hollow protrusions.

* * * * *